United States Patent
Kim et al.

(10) Patent No.: US 9,560,589 B2
(45) Date of Patent: *Jan. 31, 2017

(54) METHOD AND APPARATUS FOR ACCESSING CHANNELS IN WIRELESS LAN SYSTEM

(71) Applicant: LG Electronics Inc., Seoul (KR)

(72) Inventors: Jeongki Kim, Anyang-si (KR); Yongho Seok, Anyang-si (KR); Jinsam Kwak, Anyang-si (KR); Jinsoo Choi, Anyang-si (KR)

(73) Assignee: LG ELEctronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/197,024

(22) Filed: Jun. 29, 2016

(65) Prior Publication Data

US 2016/0309505 A1    Oct. 20, 2016

Related U.S. Application Data

(63) Continuation of application No. 14/374,433, filed as application No. PCT/KR2013/000875 on Feb. 4, 2013, now Pat. No. 9,426,736.

(Continued)

(51) Int. Cl.
*H04W 52/02* (2009.01)
*H04W 74/00* (2009.01)
(Continued)

(52) U.S. Cl.
CPC ......... *H04W 52/0209* (2013.01); *H04W 4/005* (2013.01); *H04W 52/0216* (2013.01);
(Continued)

(58) Field of Classification Search
CPC .. H04W 52/00; H04W 52/02; H04W 52/0209; H04W 52/0219; H04W 52/0216; H04W 52/0235

See application file for complete search history.

(56) References Cited

U.S. PATENT DOCUMENTS

2004/0114534 A1    6/2004    Benveniste
2004/0264397 A1    12/2004   Benveniste
(Continued)

FOREIGN PATENT DOCUMENTS

KR    10-2007-0033287 A    3/2007
KR    10-2009-0067009 A    6/2009
(Continued)

OTHER PUBLICATIONS

"PS-Poll Immediate ACK Enhancements", IEEE 802.11-12/0327r0 (Mar. 2012).

*Primary Examiner* — Ashley Shivers
(74) *Attorney, Agent, or Firm* — Dentons US LLP

(57) ABSTRACT

The present invention relates to a wireless communication system, and more specifically, to a method and apparatus for accessing channels in a wireless LAN system. The method for accessing channels in a station (STA) of the wireless communication system according to one embodiment of the present invention comprises the steps of transmitting a first frame of a channel access request to an access point (AP); and receiving, from the AP, a second frame related to whether access to the channel is allowed in response to the first frame, wherein the second frame can include a value for a channel access start offset with respect to the STA.

6 Claims, 36 Drawing Sheets

Related U.S. Application Data

(60) Provisional application No. 61/594,359, filed on Feb. 2, 2012, provisional application No. 61/602,554, filed on Feb. 23, 2012.

(51) Int. Cl.
| | | |
|---|---|---|
| *H04W 72/12* | (2009.01) | |
| *H04W 4/00* | (2009.01) | |
| *H04W 84/12* | (2009.01) | |

(52) U.S. Cl.
CPC ... *H04W 52/0219* (2013.01); *H04W 52/0229* (2013.01); *H04W 52/0235* (2013.01); *H04W 72/1289* (2013.01); *H04W 74/004* (2013.01); *H04W 84/12* (2013.01)

(56) References Cited

U.S. PATENT DOCUMENTS

| | | | |
|---|---|---|---|
| 2007/0147284 A1 | 6/2007 | Sammour et al. | |
| 2010/0271995 A1 | 10/2010 | Seok | H04W 52/0219 370/311 |
| 2011/0225440 A1 | 9/2011 | Kwon | H04W 52/0235 713/323 |
| 2013/0051293 A1 | 2/2013 | Wentink | H04W 52/0216 370/311 |
| 2013/0141215 A1 | 6/2013 | Merlin | H04W 52/0209 340/7.34 |

FOREIGN PATENT DOCUMENTS

| | | |
|---|---|---|
| KR | 10-2010-0071994 A | 6/2010 |
| KR | 10-2010-0089262 A | 8/2010 |
| WO | 2011-146204 A2 | 11/2011 |

FIG. 7
(a) 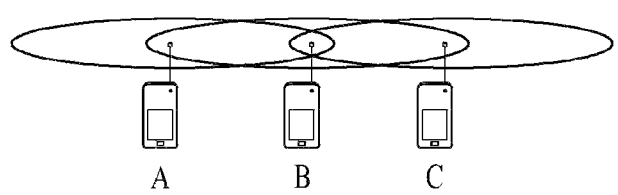
(b) 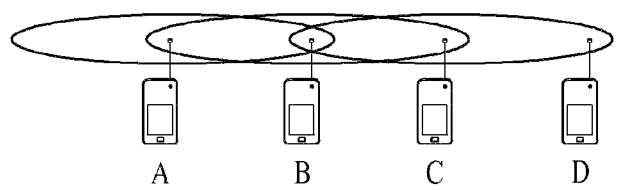

| Frame Control | AID | BSSID | FCS |
|---|---|---|---|

Otect :   2       2       6       2

(b)

| Frame Control | AID | BSSID | UL/DL indicator | FCS |
|---|---|---|---|---|

Otect :   2       2       6       1       2

FIG. 18

| (a) | Frame Control | AID | BSSID | Time stamp | FCS |
|---|---|---|---|---|---|
| Otect: | 2 | 2 | 6 | L | 2 |

| (b) | Frame Control | AID | BSSID | ACK | FCS |
|---|---|---|---|---|---|
| Otect: | 2 | 2 | 6 | L | 2 |

| (c) | Frame Control | AID | BSSID | Channel Access start offset | Granted Channel Access Duration | FCS |
|---|---|---|---|---|---|---|
| Otect: | 2 | 2 | 6 | L1 | L2 | 2 |

| (d) | Frame Control | AID | BSSID | Current Access Group Number | Next Access Group Start Offset | FCS |
|---|---|---|---|---|---|---|
| Otect: | 2 | 2 | 6 | L1 | L2 | 2 |

FIG. 20

(a) | Response Type = 000 | Channel Access Duration |

(b) | Response Type = 000 | Channel Access Duration | Time Stamp |

(c) | Response Type = 001 | Current Channel Access Group ID (CCAGID) | Next Access Group start offset (NAGSO) |

(d) | Response Type = 001 | Current Channel Access Group ID (CCAGID) | Next Access Group Start Offset | Time Stamp | Granted Channel Access Duration (GCAD) |

(e) | Response Type = 010 | New Group ID (or new AID) |

METHOD AND APPARATUS FOR ACCESSING CHANNELS IN WIRELESS LAN SYSTEM

This application is a Continuation of U.S. application Ser. No. 14/374,433 filed Jul. 24, 2014, which is a National Stage under 35 U.S.C. 371 of International Application No. PCT/KR2013/000875 filed Feb. 4, 2013, which claims the benefit of U.S. Provisional Application No. 61/594,359 filed Feb. 2, 2012 and 61/602,554 filed Feb. 23, 2012, all of which are hereby incorporated by reference in their entirety.

TECHNICAL FIELD

The following description relates to a wireless communication system and, more particularly, to a method and apparatus for accessing a channel in a wireless local area network (LAN) system.

BACKGROUND ART

Recently, with development of information communication technology, various wireless communication technologies have been developed. Among others, a wireless local area network (WLAN) enables wireless access to the Internet using a portable terminal such as a personal digital assistant (PDA), a laptop, a portable multimedia player (PMP) in a home, an enterprise or a specific service provision area based on radio frequency technology.

In order to overcome limitations in communication rate which have been pointed out as weakness of a WLAN, in recent technical standards, a system for increasing network speed and reliability and extending wireless network distance has been introduced. For example, in IEEE 802.11n, multiple input and multiple output (MIMO) technology using multiple antennas in a transmitter and a receiver has been introduced in order to support high throughput (HT) with a maximum data rate of 540 Mbps or more, to minimize transmission errors, and to optimize data rate.

DISCLOSURE

Technical Problem

As next-generation communication technology, machine-to-machine (M2M) communication technology has been discussed. Even in an IEEE 802.11 WLAN system, technical standards supporting M2M communication have been developed as IEEE 802.11ah. In M2M communication, a scenario in which a small amount of data is communicated at a low rate may be considered in an environment in which many apparatuses are present.

Communication in a WLAN system is performed in a medium shared between all apparatuses. As in M2M communication, if the number of apparatuses is increased, in order to reduce unnecessary power consumption and interference, a channel access mechanism needs to be more efficiently improved.

An object of the present invention devised to solve the problem lies in an improved channel access method and apparatus in a WLAN system.

The technical problems solved by the present invention are not limited to the above technical problems and those skilled in the art may understand other technical problems from the following description.

Technical Solution

The object of the present invention can be achieved by providing a method of performing channel access at a station (STA) in a wireless communication system, including transmitting a first frame related to a channel access request to an access point (AP), and receiving, from the AP, a second frame related to whether channel access is granted, in response to the first frame, wherein the second frame includes a value of a channel access start offset for the STA In another aspect of the present invention, provided herein is a method of supporting channel access of a station (STA) in an access point (AP) of a wireless communication system, including receiving a first frame related to a channel access request from the STA, and transmitting, to the STA, a second frame related to whether channel access is granted, in response to the first frame, wherein the second frame includes a value of a channel access start offset for the STA.

In another aspect of the present invention, provided herein is a station (STA) apparatus for performing channel access in a wireless communication system, including a transceiver, and a processor, wherein the processor is configured to transmit a first frame related to a channel access request to an access point (AP) and to receive, from the AP, a second frame related to whether channel access is granted, in response to the first frame, wherein the second frame includes a value of a channel access start offset for the STA.

In another aspect of the present invention, provided herein is an access point (AP) apparatus for supporting channel access of a station (STA) in a wireless communication system, including a transceiver, and a processor, wherein the processor is configured to receive a first frame related to a channel access request from the STA and to transmit, to the STA, a second frame related to whether channel access is granted, in response to the first frame, wherein the second frame includes a value of a channel access start offset for the STA.

The embodiments of the present invention may have the following features.

The value of the channel access start offset may determine when channel access of the STA starts to be granted or when the STA wakes up again after entering a sleep state.

The first frame may include at least one of an association identifier (AID) of the STA, a group ID assigned to the STA or uplink (UL)/downlink (DL) channel access request indicator information.

The second frame may include at least one of a timestamp, acknowledgement (ACK), granted channel access duration, a current access group number, a current channel access group identifier, a next access group start offset, a channel access start offset or a new STA identifier.

The channel access start offset may be one of a downlink data reception start time of the STA, a start time of a channel access interval at which uplink data transmission of the STA is granted, a next beacon transmission time, a next beacon transmission start time for a group corresponding to the STA, or a channel access start time of a group assigned to the STA.

The second frame may include response type information, and the response type information may indicate one of channel access allowance, channel access rejection or STA identifier reassignment.

The first frame may be one of a power save (PS)-Poll frame or a channel access request frame.

The second frame may be one of an ACK frame, an access control frame or a channel access response frame.

The first frame may be transmitted if the STA is switched from a sleep state to an awake state.

Without receiving a beacon including a traffic indication map (TIM), transmission of the first frame is allowed in an awake state of the STA.

Whether channel access is granted may be determined by the AP based on whether a page identifier of the STA matches a page identifier related to a current channel access interval.

The transmitting the first frame related to the channel access request to the AP may be performed during a channel access interval during which channel access of a group, to which the identifier of the STA belongs, is not granted.

It is to be understood that both the foregoing general description and the following detailed description of the present invention are exemplary and explanatory and are intended to provide further explanation of the invention as claimed.

Advantageous Effects

According to the present invention, it is possible to provide an improved channel access method and apparatus in a WLAN system. According to the present invention, it is possible to provide a channel access method and apparatus for preventing power consumption and interference.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram illustrating a hidden node and an exposed node;

FIG. 17 is a diagram showing examples of a channel access request (CA-REQ) frame format proposed by the present invention;

FIGS. 18 to 20 are diagrams showing examples of a channel access response (CA-RSP) frame format proposed by the present invention;

BEST MODE

Figure 1:
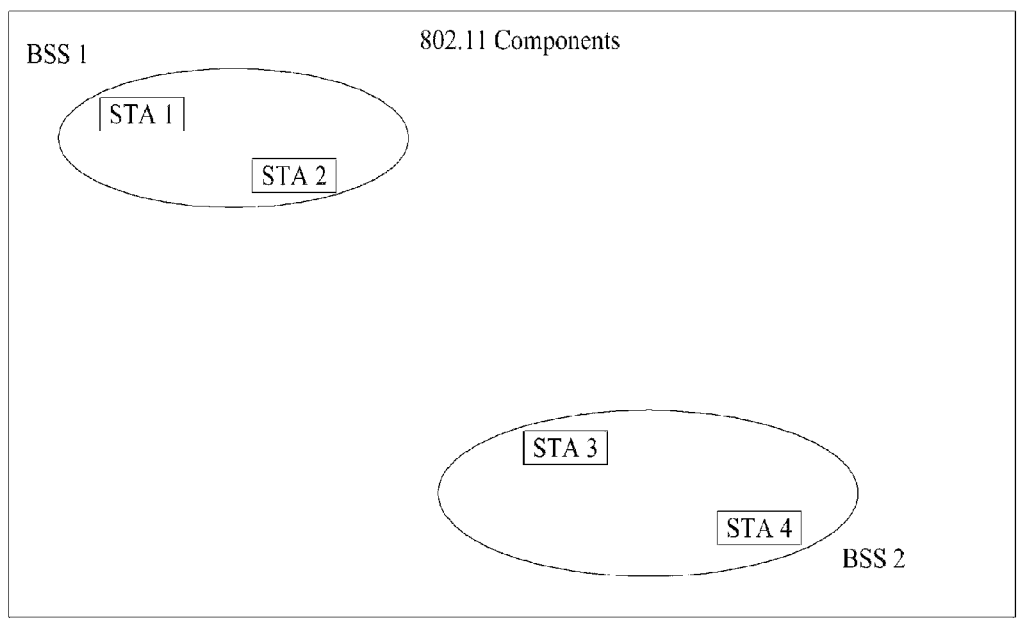
FIG. 1 is a diagram showing an exemplary structure of an IEEE 802.11 system to which the present invention is applicable.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments by which the concepts explained herein can be practiced. The detailed description includes details for the purpose of providing an understanding of the present invention. However, it will be apparent to those skilled in the art that these teachings may be implemented and practiced without these specific details.

The following embodiments are proposed by combining constituent components and characteristics of the present invention according to a predetermined format. The individual constituent components or characteristics should be considered optional factors on the condition that there is no additional remark. As required, the individual constituent components or characteristics need not be combined with other components or characteristics. Also, some constituent components and/or characteristics may be combined to implement the embodiments of the present invention. The order of operations to be disclosed in the embodiments of the present invention may be rearranged. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied using radio technology such as UTRA (Universal Terrestrial Radio Access) or CDMA2000. TDMA may be embodied with radio technology such as GSM (Global System for Mobile communications)/GPRS (General Packet Radio Service)/EDGE (Enhanced Data Rates for GSM Evolution). OFDMA may be embodied with radio technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on the IEEE 802.11 system. However, technical features of the present invention are not limited thereto.

Structure of WLAN System

FIG. 1 is a diagram showing an exemplary structure of an IEEE 802.11 system to which the present invention is applicable.

An IEEE 802.11 structure may be composed of a plurality of components and a wireless local area network (WLAN) supporting station (STA) mobility transparent to a higher layer may be provided by interaction among the components. A basic service set (BSS) may correspond to a basic component block in an IEEE 802.11 LAN. In FIG. 1, two BSSs (BSS1 and BSS2) are present and each BSS includes two STAs (STA1 and STA2 are included in BSS1 and STA3 and STA4 are included in BSS2) as members. In FIG. 1, an ellipse indicating the BSS indicates a coverage area in which STAs included in the BSS maintains communication. This area may be referred to as a basic service area (BSA). If an STA moves out of a BSA, the STA cannot directly communicate with other STAs in the BSA.

In an IEEE 802.11 LAN, a BSS is basically an independent BSS (IBSS). For example, the IBSS may have only two STAs. In addition, the simplest BSS (BSS1 or BSS2) of FIG. 1, in which other components are omitted, may correspond to a representative example of the IBSS. Such a configuration is possible when STAs can directly perform communication. In addition, such a LAN is not configured in advance but may be configured if a LAN is necessary. This LAN may also be referred to as an ad-hoc network.

If an STA is turned on or off or if an STA enters or moves out of a BSS, the membership of the STA in the BSS may be dynamically changed. An STA may join a BSS using a synchronization process in order to become a member of the BSS. In order to access all services of a BSS based structure, an STA should be associated with the BSS. Such association may be dynamically set and may include use of a distribution system service (DSS).

Figure 2:
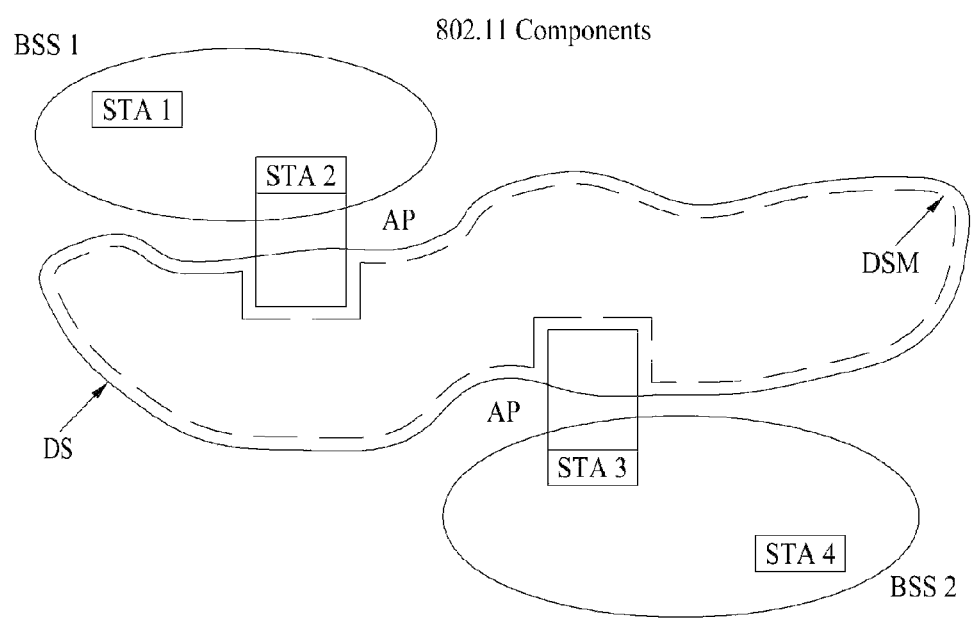
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, a distribution system (DS), a distribution system medium (DSM) and an access point (AP) are added to the structure of FIG. 1.

In a LAN, a direct station-to-station distance may be restricted by PHY performance. Although such distance restriction may be possible, communication between stations located at a longer distance may be necessary. In order to support extended coverage, a DS may be configured.

The DS means a structure in which BSSs are mutually connected. More specifically, the BSSs are not independently present as shown in FIG. 1 but the BSS may be present as an extended component of a network including a plurality of BSSs.

The DS is a logical concept and may be specified by characteristics of the DSM. In IEEE 802.11 standards, a wireless medium (WM) and a DSM are logically distinguished. Logical media are used for different purposes and are used by different components. In IEEE 802.11 standards, such media are not restricted to the same or different media. Since plural media are logically different, an IEEE 802.11 LAN structure (a DS structure or another network structure) may be flexible. That is, the IEEE 802.11 LAN structure may be variously implemented and a LAN structure may be independently specified by physical properties of each implementation.

The DS provides seamless integration of a plurality of BSSs and provides logical services necessary to treat an address to a destination so as to support a mobile apparatus.

The AP means an entity which enables associated STAs to access the DS via the WM and has STA functionality. Data transfer between the BSS and the DS may be performed via the AP. For example, STA2 and STA3 shown in FIG. 2 have STA functionality and provide a function enabling associated STAs (STA1 and STA4) to access the DS. In addition, since all APs correspond to STAs, all APs may be addressable entities. An address used by the AP for communication on the WM and an address used by the AP for communication on the DSM may not be equal.

Data transmitted from one of STAs associated with the AP to the STA address of the AP may always be received by an uncontrolled port and processed by an IEEE 802.1X port access entity. In addition, if a controlled port is authenticated, transmission data (or frames) may be transmitted to the DS.

Figure 3:
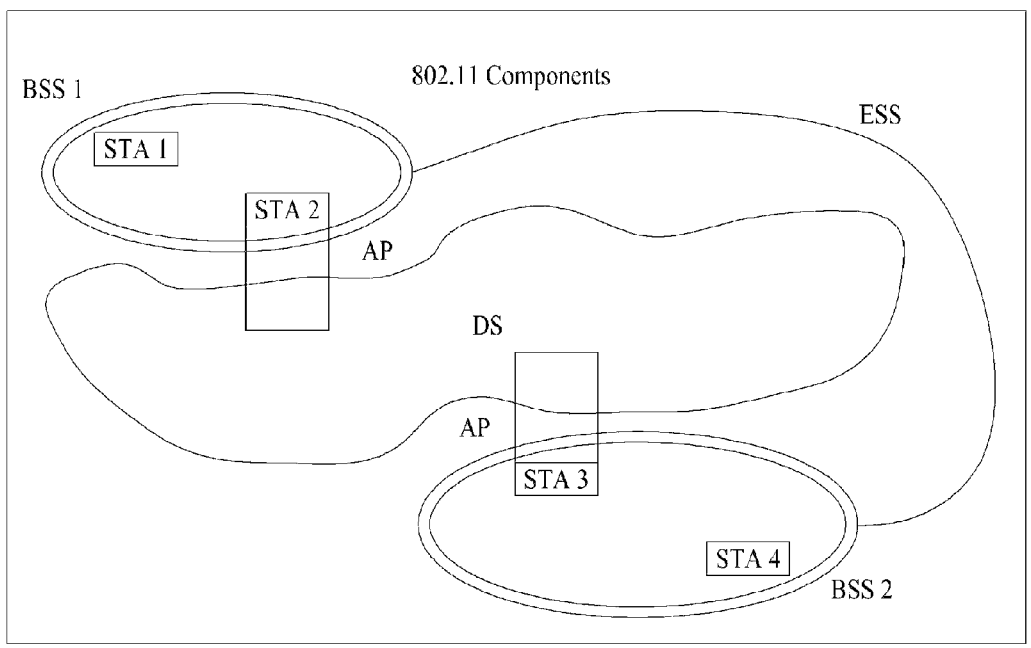
FIG. 3 is a diagram showing another exemplary structure of an IEEE 802.11 system to which the present invention is applicable.

FIG. 3 is a diagram showing another exemplary structure of an IEEE 802.11 system to which the present invention is applicable. In FIG. 3, an extended service set (ESS) for providing wide coverage is added to the structure of FIG. 2.

A wireless network having an arbitrary size and complexity may be composed of a DS and BSSs. In an IEEE 802.11 system, such a network is referred to as an ESS network. The ESS may correspond to a set of BSSs connected to one DS. However, the ESS does not include the DS. The ESS network appears as an IBSS network at a logical link control (LLC) layer. STAs included in the ESS may communicate with each other and mobile STAs may move from one BSS to another BSS (within the same ESS) transparently to the LLC layer.

In IEEE 802.11, relative physical locations of the BSSs in FIG. 3 are not assumed and may be defined as follows. The BSSs may partially overlap in order to provide consecutive coverage. In addition, the BSSs may not be physically connected and a distance between BSSs is not logically restricted. In addition, the BSSs may be physically located at the same location in order to provide redundancy. In addition, one (or more) IBSS or ESS network may be physically present in the same space as one (or more) ESS network. This corresponds to an ESS network type such as a case in which an ad-hoc network operates at a location where the ESS network is present, a case in which IEEE 802.11 networks physically overlapped by different organizations are configured or a case in which two or more different access and security policies are necessary at the same location.

Figure 4:
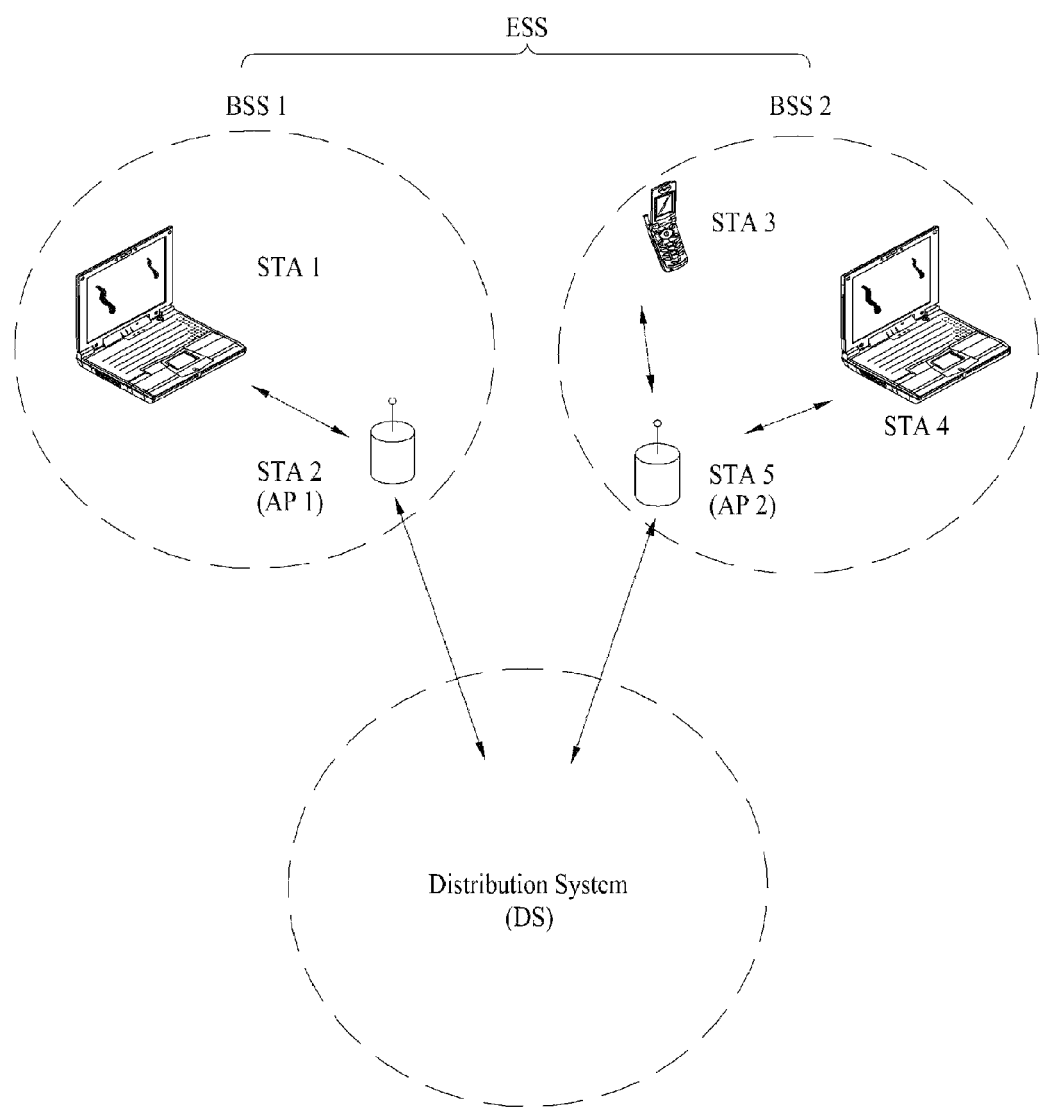
FIG. 4 is a diagram showing an exemplary structure of a WLAN system.

FIG. 4 is a diagram showing an exemplary structure of a WLAN system. FIG. 4 shows an example of an infrastructure BSS including a DS.

In the example of FIG. 4, BSS1 and BSS2 configure an ESS. In the WLAN system, an STA operates according to a MAC/PHY rule of IEEE 802.11. The STA includes an AP STA and a non-AP STA. The non-AP STA corresponds to an apparatus directly handled by a user, such as a laptop or a mobile phone. In the example of FIG. 4, STA1, STA3 and STA4 correspond to the non-AP STA and STA2 and STA5 correspond to the AP STA.

In the following description, the non-AP STA may be referred to as a terminal, a wireless transmit/receive unit (WTRU), a user equipment (UE), a mobile station (MS), a mobile terminal or a mobile subscriber station (MSS). In addition, the AP may correspond to a base station (BS), a Node-B, an evolved Node-B (eNB), a base transceiver system (BTS) or a femto BS.

Link Setup Process

Figure 5:
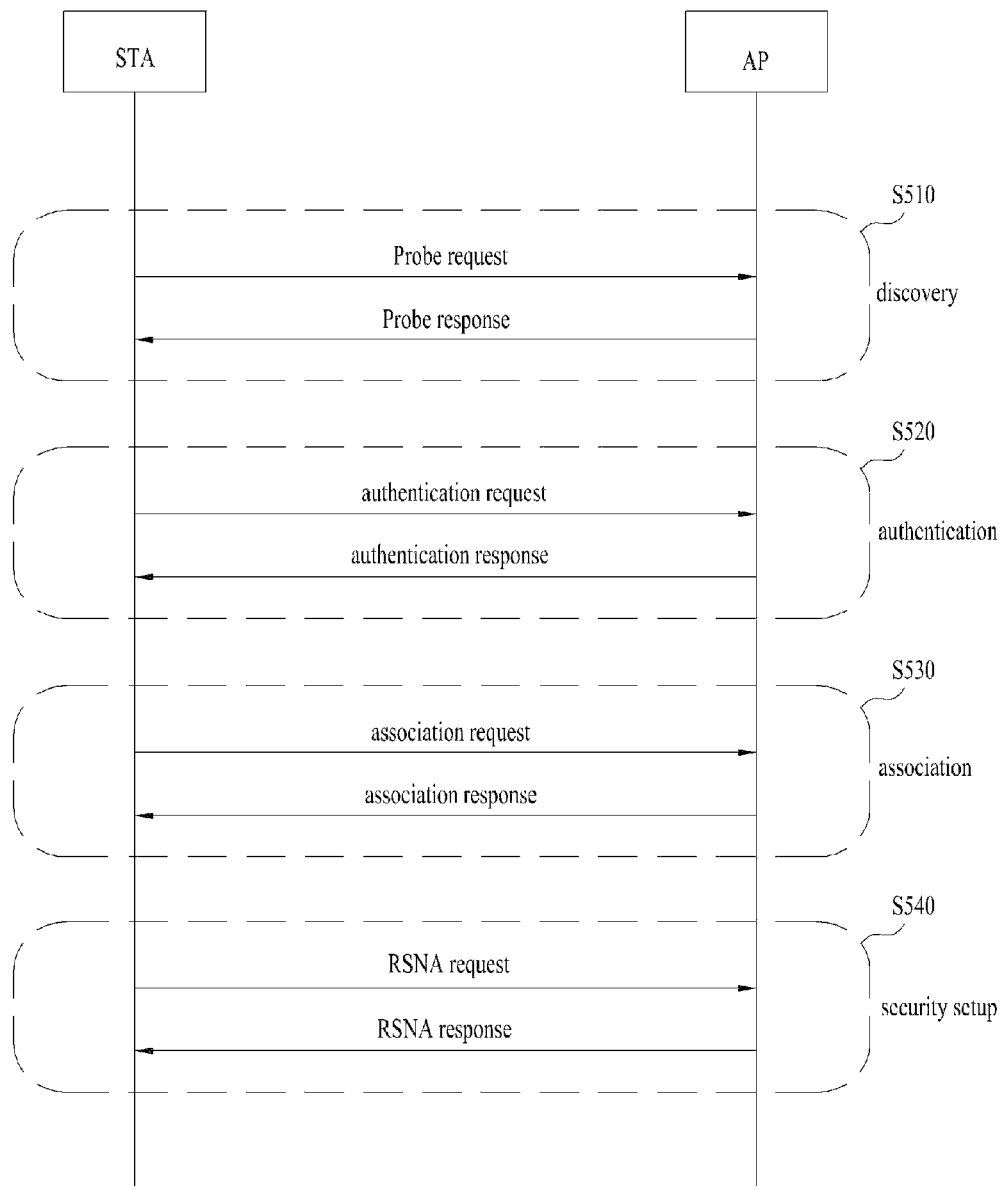
FIG. 5 is a diagram illustrating a link setup process in a WLAN system.

FIG. 5 is a diagram illustrating a general link setup process.

In order to establish a link with respect to a network and perform data transmission and reception, an STA discovers the network, performs authentication, establishes association and performs an authentication process for security. The link setup process may be referred to as a session initiation process or a session setup process. In addition, discovery, authentication, association and security setup of the link setup process may be collectively referred to as an association process.

An exemplary link setup process will be described with reference to FIG. 5.

In step S510, the STA may perform a network discovery operation. The network discovery operation may include a scanning operation of the STA. That is, the STA discovers the network in order to access the network. The STA should identify a compatible network before participating in a wireless network and a process of identifying a network present in a specific area is referred to as scanning.

The scanning method includes an active scanning method and a passive scanning method.

In FIG. 5, a network discovery operation including an active scanning process is shown. In active scanning, the STA which performs scanning transmits a probe request frame while moving between channels and waits for a response thereto, in order to detect which AP is present. A responder transmits a probe response frame to the STA, which transmitted the probe request frame, as a response to the probe request frame. The responder may be an STA which lastly transmitted a beacon frame in a BSS of a scanned channel. In the BSS, since the AP transmits the beacon frame, the AP is the responder. In the IBSS, since the STAs in the IBSS alternately transmit the beacon frame, the responder is not fixed. For example, the STA which transmits the probe request frame on a first channel and receives the probe response frame on the first channel stores BSS related information included in the received probe response frame, moves to a next channel (e.g., a second channel) and performs scanning (probe request/response transmission/reception on the second channel) using the same method.

Although not shown in FIG. 5, a scanning operation may be performed using a passive scanning method. In passive scanning, the STA which performs scanning waits for a beacon frame while moving between channels. The beacon frame is a management frame in IEEE 802.11 and is periodically transmitted in order to indicate presence of a wireless network and to enable the STA, which performs scanning, to discover and participate in the wireless network. In the BSS, the AP is responsible for periodically transmitting the beacon frame. In the IBSS, the STAs alternately transmit the beacon frame. The STA which performs scanning receives the beacon frame, stores information about the BSS included in the beacon frame, and records beacon frame information of each channel while moving to another channel. The STA which receives the beacon frame may store BSS related information included in the received beacon frame, move to a next channel and perform scanning on the next channel using the same method.

Active scanning has delay and power consumption less than those of passive scanning.

After the STA has discovered the network, an authentication process may be performed in step S520. Such an authentication process may be referred to as a first authentication process to be distinguished from a security setup operation of step S540.

The authentication process includes a process of, at the STA, transmitting an authentication request frame to the AP and, at the AP, transmitting an authentication response frame to the STA in response thereto. The authentication frame used for authentication request/response corresponds to a management frame.

The authentication frame may include information about an authentication algorithm number, an authentication transaction sequence number, a status code, a challenge text, a robust security network (RSN), a finite cyclic group, etc. The information may be examples of information included in the authentication request/response frame and may be replaced with other information. The information may further include additional information.

The STA may transmit the authentication request frame to the AP. The AP may determine whether authentication of the STA is allowed, based on the information included in the received authentication request frame. The AP may provide the STA with the authentication result via the authentication response frame.

After the STA is successfully authenticated, an association process may be performed in step S530. The association process includes a process of, at the STA, transmitting an association request frame to the AP and, at the AP, transmitting an association response frame to the STA in response thereto.

For example, the association request frame may include information about various capabilities, beacon listen interval, service set identifier (SSID), supported rates, RSN, mobility domain, supported operating classes, traffic indication map (TIM) broadcast request, interworking service capability, etc.

For example, the association response frame may include information about various capabilities, status code, association ID (AID), supported rates, enhanced distributed channel access (EDCA) parameter set, received channel power indicator (RCPI), received signal to noise indicator (RSNI), mobility domain, timeout interval (association comeback time), overlapping BSS scan parameter, TIM broadcast response, QoS map, etc.

This information is purely exemplary information included in the association request/response frame and may be replaced with other information. This information may further include additional information.

After the STA is successfully authenticated, a security setup process may be performed in step S540. The security setup process of step S540 may be referred to as an authentication process through a robust security network association (RSNA) request/response. The authentication process of step S520 may be referred to as the first authentication process and the security setup process of step S540 may be simply referred to as an authentication process.

The security setup process of step S540 may include a private key setup process through 4-way handshaking of an extensible authentication protocol over LAN (EAPOL)

frame. In addition, the security setup process may be performed according to a security method which is not defined in the IEEE 802.11 standard.

Evolution of WLAN

As a technical standard recently established in order to overcome limitations in communication speed in a WLAN, IEEE 802.11n has been devised. IEEE 802.11n aims at increasing network speed and reliability and extending wireless network distance. More specifically, IEEE 802.11n is based on multiple input and multiple output (MIMO) technology using multiple antennas in a transmitter and a receiver in order to support high throughput (HT) with a maximum data rate of 540 Mbps or more, to minimize transmission errors, and to optimize data rate.

As WLANs have come into widespread use and applications using the same have been diversified, recently, there is a need for a new WLAN system supporting throughput higher than a data rate supported by IEEE 802.11n. A next-generation WLAN system supporting very high throughput (VHT) is a next version (e.g., IEEE 802.11ac) of the IEEE 802.11n WLAN system and is an IEEE 802.11 WLAN system newly proposed in order to support a data rate of 1 Gbps or more at a MAC service access point (SAP).

The next-generation WLAN system supports a multi-user MIMO (MU-MIMO) transmission scheme by which a plurality of STAs simultaneously accesses a channel in order to efficiently use a radio channel. According to the MU-MIMO transmission scheme, the AP may simultaneously transmit packets to one or more MIMO-paired STAs.

In addition, support of a WLAN system operation in a whitespace is being discussed. For example, introduction of a WLAN system in a TV whitespace (WS) such as a frequency band (e.g., 54 to 698 MHz) in an idle state due to digitalization of analog TVs is being discussed as the IEEE 802.11af standard. However, this is only exemplary and the whitespace may be incumbently used by a licensed user. The licensed user means a user who is allowed to use a licensed band and may be referred to as a licensed device, a primary user or an incumbent user.

For example, the AP and/or the STA which operate in the WS should provide a protection function to the licensed user. For example, if a licensed user such as a microphone already uses a specific WS channel which is a frequency band divided on regulation such that a WS band has a specific bandwidth, the AP and/or the STA cannot use the frequency band corresponding to the WS channel in order to protect the licensed user. In addition, the AP and/or the STA must stop use of the frequency band if the licensed user uses the frequency band used for transmission and/or reception of a current frame.

Accordingly, the AP and/or the STA should perform a procedure of determining whether a specific frequency band in a WS band is available, that is, whether a licensed user uses the frequency band. Determining whether a licensed user uses a specific frequency band is referred to as spectrum sensing. As a spectrum sensing mechanism, an energy detection method, a signature detection method, etc. may be used. It may be determined that the licensed user uses the frequency band if received signal strength is equal to or greater than a predetermined value or if a DTV preamble is detected.

In addition, as next-generation communication technology, machine-to-machine (M2M) communication technology is being discussed. Even in an IEEE 802.11 WLAN system, a technical standard supporting M2M communication has been developed as IEEE 802.11 ah. M2M communication means a communication scheme including one or more machines and may be referred to as machine type communication (MTC). Here, a machine means an entity which does not require direct operation or intervention of a person. For example, a device including a mobile communication module, such as a meter or a vending machine, may include a user equipment such as a smart phone which is capable of automatically accessing a network without operation/intervention of a user to perform communication. M2M communication includes communication between devices (e.g., device-to-device (D2D) communication) and communication between a device and an application server. Examples of communication between a device and a server include communication between a vending machine and a server, communication between a point of sale (POS) device and a server and communication between an electric meter, a gas meter or a water meter and a server. An M2M communication based application may include security, transportation, health care, etc. If the characteristics of such examples are considered, in general, M2M communication should support transmission and reception of a small amount of data at a low rate in an environment in which very many apparatuses are present.

More specifically, M2M communication should support a larger number of STAs. In a currently defined WLAN system, it is assumed that a maximum of 2007 STAs is associated with one AP. However, in M2M communication, methods supporting the case in which a larger number of STAs (about 6000) are associated with one AP are being discussed. In addition, in M2M communication, it is estimated that there are many applications supporting/requiring a low transfer rate. In order to appropriately support the low transfer rate, for example, in a WLAN system, the STA may recognize presence of data to be transmitted thereto based on a traffic indication map (TIM) element and methods of reducing a bitmap size of the TIM are being discussed. In addition, in M2M communication, it is estimated that there is traffic having a very long transmission/reception interval. For example, in electricity/gas/water consumption, a very small amount of data is required to be exchanged at a long period (e.g., one month). In a WLAN system, although the number of STAs associated with one AP is increased, methods of efficiently supporting the case in which the number of STAs, in which a data frame to be received from the AP is present during one beacon period, is very small are being discussed.

WLAN technology has rapidly evolved. In addition to the above-described examples, technology for direct link setup, improvement of media streaming performance, support of fast and/or large-scale initial session setup, support of extended bandwidth and operating frequency, etc. is being developed.

Medium Access Mechanism

In a WLAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF interframe space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception AP and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention free period (CFP).

Figure 6:
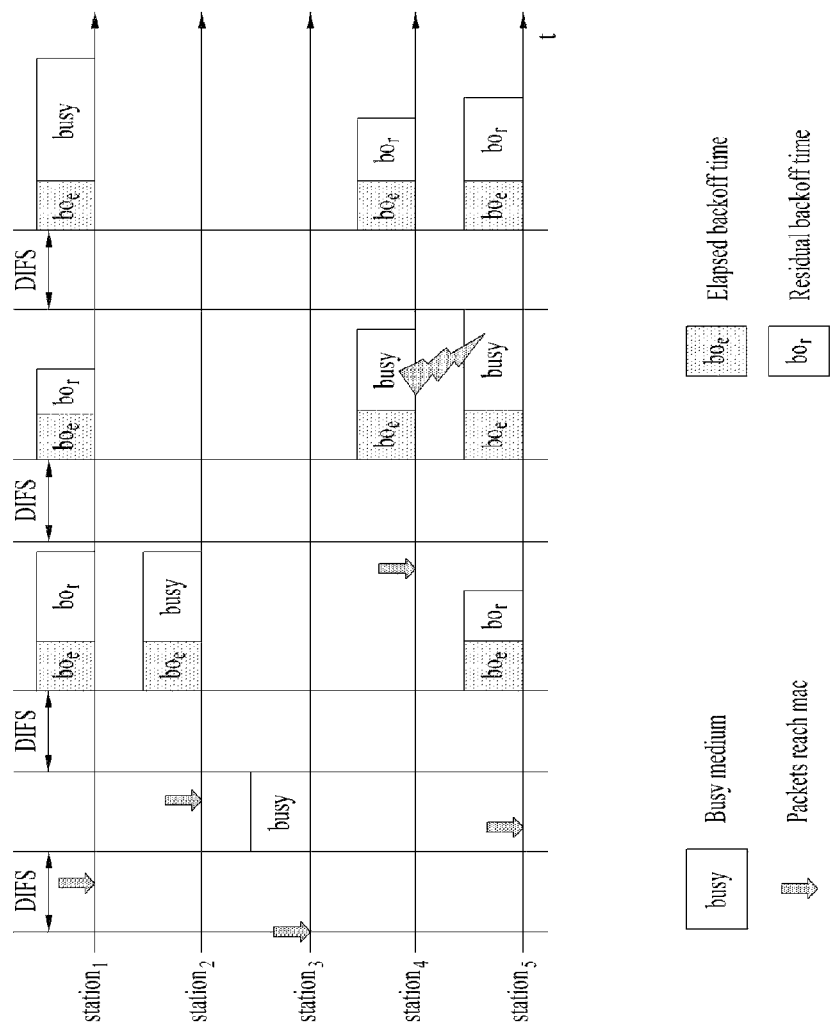
FIG. 6 is a diagram illustrating a backoff process.

FIG. 6 is a diagram illustrating a backoff process.

Operation based on a random backoff period will be described with reference to FIG. 6. If a medium is changed from an occupied or busy state to an idle state, several STAs may attempt data (or frame) transmission. At this time, a method of minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin. CW, CWmin and CWmax values are preferably set to $2^n-1$ (n=0, 1, 2, ... ).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 6, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values. In the example of FIG. 6, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state again, STA1 and STA5 wait for the DIFS and then resume countdown. That is, after the residual backoff slots corresponding to the residual backoff time are counted down, frame transmission may start. Since the residual backoff time of STA5 is less than of STA1, STA5 starts frame transmission. If STA2 occupies the medium, data to be transmitted may be generated in the STA5. At this time, STA4 may wait for the DIFS if the medium enters the idle state, perform countdown according to a random backoff count value selected thereby, and start frame transmission. In the example of FIG. 6, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a WLAN may use a network allocation vector (NAV). The NAV refers to a value of a time until a medium becomes available, which is indicated to another AP and/or STA by an AP and/or an STA, which is currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 7 and 8. Although a transmission range may not be equal to an actual carrier sensing range, for convenience, assume that the transmission range may be equal to the actual carrier sensing range.

FIG. 7 is a diagram illustrating a hidden node and an exposed node.

FIG. 7(a) shows a hidden node, and, in this case, an STA A and an STA B are performing communication and an STA C has information to be transmitted. More specifically, although the STA A transmits information to the STA B, the STA C may determine that the medium is in the idle state, when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be the hidden node of the STA C.

FIG. 7(b) shows an exposed node and, in this case, the STA B transmits data to the STA A and the STA C has information to be transmitted to the STA D. In this case, if the STA C performs carrier sensing, it may be determined that the medium is busy due to transmission of the STA B. If the STA C has information to be transmitted to the STA D, since it is sensed that the medium is busy, the STA C waits until the medium enters the idle state. However, since the STA A is actually outside the transmission range of the STA C, transmission from the STA C and transmission from the STA B may not collide from the viewpoint of the STA A. Therefore, the STA C unnecessarily waits until transmission of the STA B is stopped. At this time, the STA C may be the exposed node of the STA B.

Figure 8:
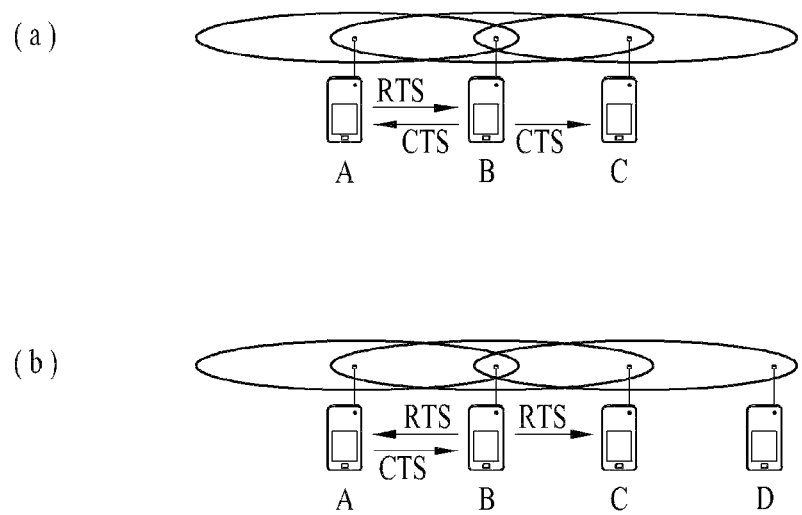
FIG. 8 is a diagram illustrating request to send (RTS) and clear to send (CTS)

FIG. 8 is a diagram illustrating request to send (RTS) and clear to send (CTS).

In the example of FIG. 7, in order to efficiently use a collision avoidance mechanism, short signaling packet such as RTS and CTS may be used. RST/CTS between two STAs may be enabled by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 8(a) shows a method of solving a hidden node problem. Assume that both the STA A and the STA C attempt to transmit data to the STA B. If the STA A transmits the RTS to the STA B, the STA B transmits the CTS to the peripheral STA A and C. As a result, the STA C waits until data transmission of the STA A and the STA B is finished, thereby avoiding collision.

FIG. 8(b) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS of the STA A, it can be confirmed that the STA A is outside carrier sensing of the STA C.

Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, in a WLAN system, a power management (PM) mode of the STA is supported.

The PM mode of the STA is divided into an active mode and a power save (PS) mode. The STA fundamentally operates in an active mode. The STA which operates in the active mode is maintained in an awake state. The awake state refers to a state in which normal operation such as frame transmission and reception or channel scanning is possible. The STA which operates in the PS mode operates while switching between a sleep state or an awake state. The STA which operates in the sleep state operates with minimum power and does not perform frame transmission and reception or channel scanning.

Since power consumption is reduced as the sleep state of the STA is increased, the operation period of the STA is increased. However, since frame transmission and reception is impossible in the sleep state, the STA may not unconditionally operate in the sleep state. If a frame to be transmitted from the STA, which operates in the sleep state, to the AP is present, the STA may be switched to the awake state to transmit the frame. If a frame to be transmitted from the AP to the STA is present, the STA in the sleep state may not receive the frame and may not confirm that the frame to be received is present. Accordingly, the STA needs to perform an operation for switching to the awake state according to a specific period in order to confirm presence of the frame to be transmitted thereto (to receive the frame if the frame to be transmitted is present).

Figure 9:
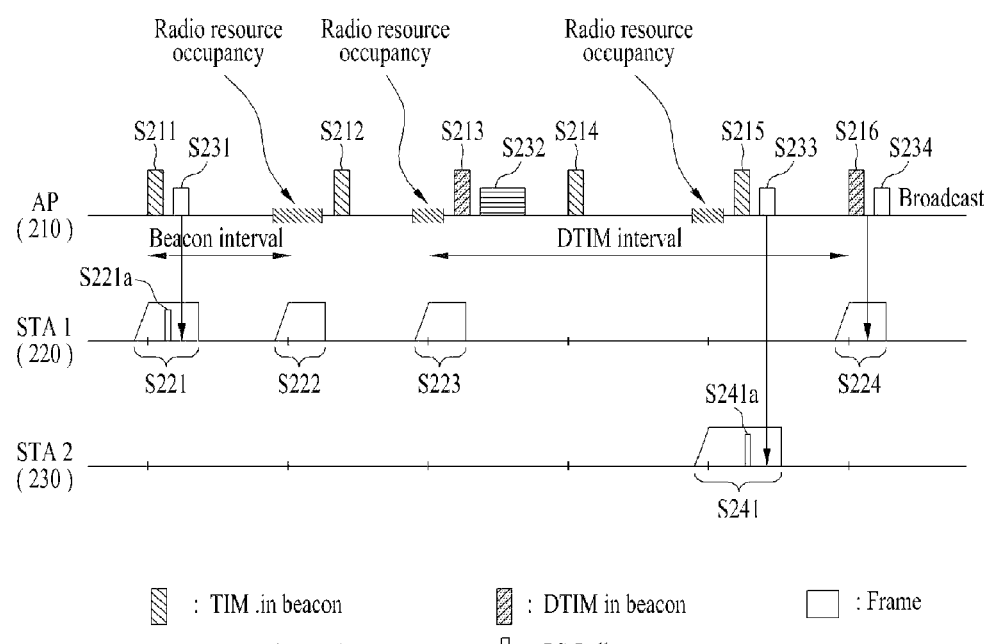
FIG. 9 is a diagram illustrating power management operation.

FIG. 9 is a diagram illustrating power management operation.

Referring to FIG. 9, an AP 210 transmits beacon frames to STAs within a BSS at a predetermined period (S211, S212, S213, S214, S215 and S216). The beacon frame includes a traffic indication map (TIM) information element. The TIM information element includes information indicating that buffered traffic for STAs associated with the AP 210 is present and the AP 210 will transmit a frame. The TIM element includes a TIM used to indicate a unicast frame or a delivery traffic indication map (DTIM) used to indicate a multicast or broadcast frame.

The AP 210 may transmit the DTIM once whenever the beacon frame is transmitted three times. An STA1 220 and an STA2 222 operate in the PS mode. The STA1 220 and the STA2 222 may be switched from the sleep state to the awake state at a predetermined wakeup interval to receive a TIM element transmitted by the AP 210. Each STA may compute a time to switch to the awake state based on a local clock thereof. In the example of FIG. 9, assume that the clock of the STA matches the clock of the AP.

For example, the predetermined awake interval may be set such that the STA1 220 is switched to the awake state every beacon interval to receive a TIM element. Accordingly, the STA1 220 may be switched to the awake state (S211) when the AP 210 first transmits the beacon frame (S211). The STA1 220 may receive the beacon frame and acquire the TIM element. If the acquired TIM element indicates that a frame to be transmitted to the STA1 220 is present, the STA1 220 may transmit, to the AP 210, a power save-Poll (PS-Poll) frame for requesting frame transmission from the AP 210 (S221a). The AP 210 may transmit the frame to the STA1 220 in correspondence with the PS-Poll frame (S231). The STA1 220 which completes frame reception is switched to the sleep state.

When the AP 210 secondly transmits the beacon frame, since another device access the medium and thus the medium is busy, the AP 210 may not transmit the beacon frame at an accurate beacon interval and may transmit the beacon frame at a delayed time (S212). In this case, the operation mode of the STA1 220 is switched to the awake state according to the beacon interval but the delayed beacon frame is not received. Therefore, the operation mode of the STA1 220 is switched to the sleep state again (S222).

When the AP 210 thirdly transmits the beacon frame, the beacon frame may include a TIM element set to a DTIM. Since the medium is busy, the AP 210 transmits the beacon frame at a delayed time (S213). The STA1 220 is switched to the awake state according to the beacon interval and may acquire the DTIM via the beacon frame transmitted by the AP 210. Assume that the DTIM acquired by the STA1 220 indicates that a frame to be transmitted to the STA1 220 is not present and a frame for another STA is present. In this case, the STA1 220 may confirm that a frame transmitted thereby is not present and may be switched to the sleep state again. The AP 210 transmits the beacon frame and then transmits the frame to the STA (S232).

The AP 210 fourthly transmits the beacon frame (S214). Since the STA1 220 cannot acquire information indicating that buffered traffic therefor is present via reception of the TIM element twice, the wakeup interval for receiving the TIM element may be controlled. Alternatively, if signaling information for controlling the wakeup interval of the STA1 220 is included in the beacon frame transmitted by the AP 210, the wakeup interval value of the STA1 220 may be controlled. In the present example, the STA1 220 may change switching of the operation state for receiving the TIM element every beacon interval to switching of the operation state every three beacon intervals. Accordingly, since the STA1 220 is maintained in the sleep state when the AP 210 transmits the fourth beacon frame (S214) and transmits the fifth beacon frame (S215), the TIM element cannot be acquired.

When the AP 210 sixthly transmits the beacon frame (S216), the STA1 220 may be switched to the awake state to acquire the TIM element included in the beacon frame (S224). Since the TIM element is a DTIM indicating that a broadcast frame is present, the STA1 220 may not transmit the PS-Poll frame to the AP 210 but may receive a broadcast frame transmitted by the AP 210 (S234). The wakeup interval set in the STA2 230 may be set to be greater than that of the STA1 220. Accordingly, the STA2 230 may be switched to the awake state to receive the TIM element (S241), when the AP 210 fifthly transmits the beacon frame (S215). The STA2 230 may confirm that a frame to be transmitted thereto is present via the TIM element and transmits the PS-Poll frame to the AP 210 (S241*a*) in order to request frame transmission. The AP 210 may transmit the frame to the STA2 230 in correspondence with the PS-Poll frame (S233).

For PM management shown in FIG. 9, a TIM element includes a TIM indicating whether a frame to be transmitted to an STA is present and a DTIM indicating whether a broadcast/multicast frame is present. The DTIM may be implemented by setting a field of the TIM element.

Figure 10:
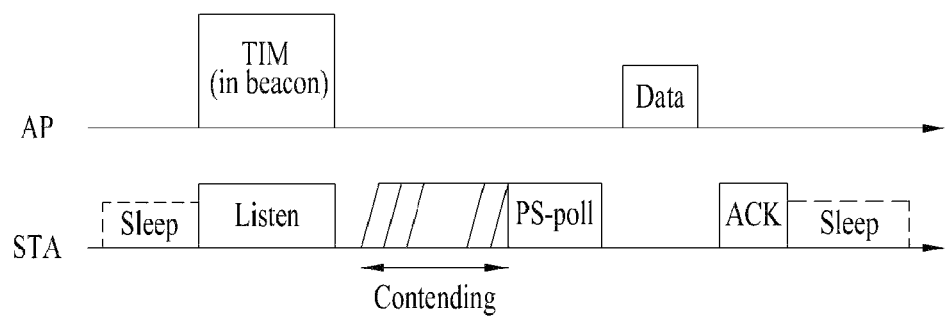
FIGS. 10 to 12 are diagrams illustrating operation of a station (STA) which receives a traffic indication map (TIM)
Figure 11:
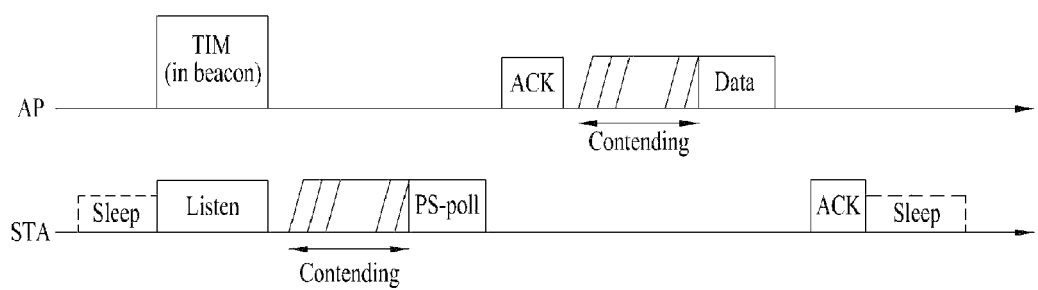
Figure 12:
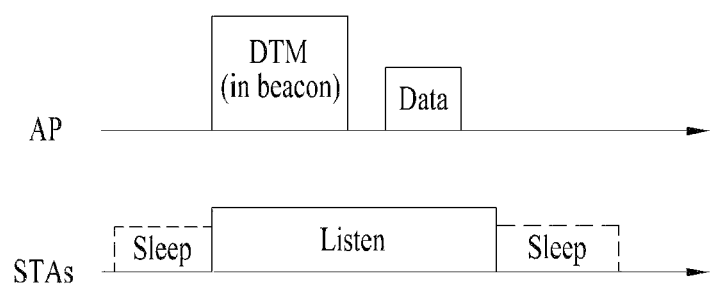

FIGS. 10 to 12 are diagrams illustrating operation of a station (STA) which receives a traffic indication map (TIM).

Referring to FIG. 10, an STA may be switched from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which receives the PS-Poll frame transmitted by the STA may transmit the frame to the STA. The STA may receive the data frame and transmit an ACK frame to the AP. Thereafter, the STA may be switched to the sleep state again.

As shown in FIG. 10, the AP may receive the PS-Poll frame from the STA and then operate according to an immediate response method for transmitting a data frame after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 11.

In the example of FIG. 11, operation for switching the STA from the sleep state to the awake state, receiving a TIM from the AP, contending and transmitting a PS-Poll frame to the AP is equal to that of FIG. 10. If the data frame is not prepared during the SIFS even when the AP receives the PS-Poll frame, the data frame is not transmitted but an ACK frame may be transmitted to the STA. If the data frame is prepared after transmitting the ACK frame, the AP may contend and transmit the data frame to the STA. The STA may transmit the ACK frame indicating that the data frame has been successfully received to the AP and may be switched to the sleep state.

FIG. 12 shows an example in which the AP transmits the DTIM. The STAs may be switched from the sleep state to the awake state in order to receive the beacon frame including the DTIM element from the AP. The STA may confirm that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may be switched to the sleep state again after completing data reception.

TIM Structure

In the PM mode management method based on the TIM (or DTIM) protocol described with reference to FIGS. 9 to 12, the STAs may confirm whether a data frame to be transmitted thereto is present via STA identification included in the TIM element. The STA identification may be related to an association identifier (AID) assigned to the STA upon association with the AP.

The AID is used as a unique identifier for each STA within one BSS. For example, in a current WLAN system, the AID may be one of values of 1 to 2007. In a currently defined WLAN system, 14 bits are assigned to the AID in a frame transmitted by the AP and/or the STA. Although up to 16383 may be assigned as the AID value, 2008 to 16383 may be reserved.

The TIM element according to an existing definition is not appropriately applied to an M2M application in which a large number (e.g., more than 2007) of STAs is associated with one AP. If the existing TIM structure extends without change, the size of the TIM bitmap is too large to be supported in an existing frame format and to be suitable for M2M communication considering an application with a low transfer rate. In addition, in M2M communication, it is predicted that the number of STAs, in which a reception data frame is present during one beacon period, is very small. Accordingly, in M2M communication, since the size of the TIM bitmap is increased but most bits have a value of 0, there is a need for technology for efficiently compressing the bitmap.

As an existing bitmap compression technology, a method of omitting 0 which continuously appears at a front part of a bitmap and defining an offset (or a start point) is provided. However, if the number of STAs in which a buffered frame is present is small but a difference between the AID values of the STAs is large, compression efficiency is bad. For example, if only frames to be transmitted to only two STAs respectively having AID values of 10 and 2000 are buffered, the length of the compressed bitmap is 1990 but all bits other than both ends have a value of 0. If the number of STAs which may be associated with one AP is small, bitmap compression inefficiency is not problematic but, if the number of STAs is increased, bitmap compression inefficiency deteriorates overall system performance.

As a method of solving this problem, AIDs may be divided into several groups to more efficiently perform data transmission. A specific group ID (GID) is assigned to each group. AIDs assigned based on the group will be described with reference to FIG. 13.

Figure 13:
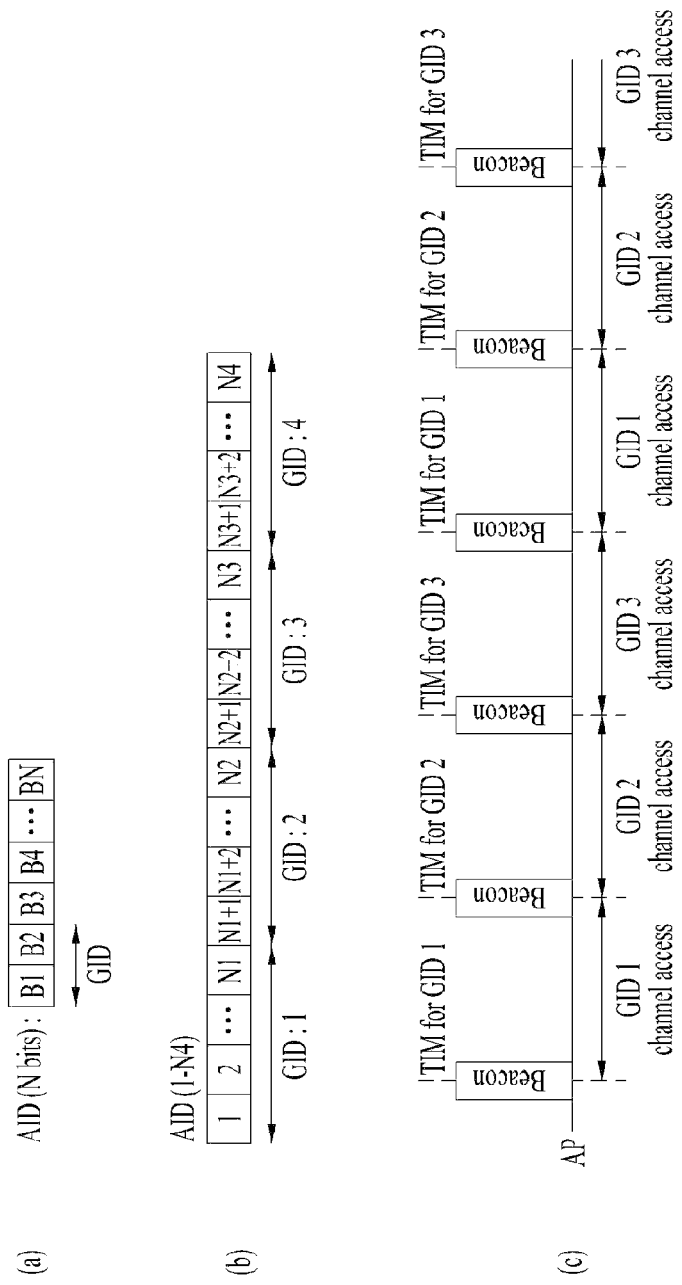
FIG. 13 is a diagram illustrating a group based association identifier (AID)

FIG. 13(*a*) shows an example of AIDs assigned based on a group. In the example of FIG. 13(*a*), several bits of a front part of the AID bitmap may be used to indicate the GID. For example, four DIDs may be expressed by the first two bits of the AID of the AID bitmap. If the total length of the AID bitmap is N bits, the first two bits (B1 and B2) indicate the GID of the AID.

FIG. 13(*a*) shows another example of AIDs assigned based on a group. In the example of FIG. 13(*b*), the GID may be assigned according to the location of the AID. At this time, the AIDs using the same GID may be expressed by an offset and a length value. For example, if GID 1 is expressed by an offset A and a length B, this means that AIDs of A to A+B−1 on the bitmap have GID 1. For example, in the example of FIG. 13(b), assume that all AIDs of 1 to N4 are divided into four groups. In this case, AIDs belonging to GID 1 are 1 to N1 and may be expressed by an offset 1 and a length N1. AIDs belonging to GID2 may be expressed by an offset N1+1 and a length N2−N1+1, AIDs belonging to GID 3 may be expressed by an offset N2+1 and a length N3−N2+1, and AIDs belonging to GID 4 may be expressed by an offset N3+1 and a length N4−N3+1.

If the AIDs assigned based on the group are introduced, channel access is allowed at a time interval which is changed according to the GID to solve lack of TIM elements for a large number of STAs and to efficiently perform data transmission and reception. For example, only channel access of STA(s) corresponding to a specific group may be granted during a specific time interval and channel access of the remaining STA(s) may be restricted. A predetermined time interval at which only access of specific STA(s) is granted may also be referred to as a restricted access window (RAW).

Channel access according to GID will be described with reference to FIG. 13(c). FIG. 13(c) shows a channel access mechanism according to a beacon interval if the AIDs are divided into three groups. At a first beacon interval (or a first RAW), channel access of STAs belonging to GID 1 is granted but channel access of STAs belonging to other GIDs is not granted. For such implementation, the first beacon includes a TIM element for AIDs corresponding to GID 1. A second beacon frame includes a TIM element for AIDs corresponding to GID 2 and thus only channel access of the STAs corresponding to the AIDs belonging to GID 2 is granted during the second beacon interval (or the second RAW). A third beacon frame includes a TIM element for AIDs corresponding to GID 3 and thus only channel access of the STAs corresponding to the AIDs belonging to GID 3 is granted during the third beacon interval (or the third RAW). A fourth beacon frame includes a TIM element for AIDs corresponding to GID 1 and thus only channel access of the STAs corresponding to the AIDs belonging to GID 1 is granted during the fourth beacon interval (or the fourth RAW). Only channel access of the STAs corresponding to a specific group indicated by the TIM included in the beacon frame may be granted even in fifth and subsequent beacon intervals (or fifth and subsequent RAWs).

Although the order of GIDs allowed according to the beacon interval is cyclic or periodic in FIG. 13(c), the present invention is not limited thereto. That is, by including only AID(s) belonging to specific GID(s) in the TIM elements, only channel access of STA(s) corresponding to the specific AID(s) may be granted during a specific time interval (e.g., a specific RAW) and channel access of the remaining STA(s) may not be granted.

The above-described group based AID assignment method may also be referred to as a hierarchical structure of a TIM. That is, an entire AID space may be divided into a plurality of blocks and only channel access of STA(s) corresponding to a specific block having a non-zero value (that is, STAs of a specific group) may be granted. A TIM having a large size is divided into small blocks/groups such that the STA easily maintains TIM information and easily manages blocks/groups according to class, QoS or usage of the STA. Although a 2-level layer is shown in the example of FIG. 13, a TIM of a hierarchical structure having two or more levels may be constructed. For example, the entire AID space may be divided into a plurality of page groups, each page group may be divided into a plurality of blocks, and each block may be divided into a plurality of sub-blocks. In this case, as an extension of the example of FIG. 13(a), the first N1 bits of the AID bitmap indicate a paging ID (that is, a PID), the next N2 bits indicate a block ID, the next N3 bits indicate a sub-block ID, and the remaining bits indicate the STA bit location in the sub-block.

In the following examples of the present invention, various methods of dividing and managing STAs (or AIDs assigned to the STAs) on a predetermined hierarchical group basis are applied and the group based AID assignment method is not limited to the above examples.

Improved Channel Access Method

If AIDs are assigned/managed based on a group, STAs belonging to a specific group may use a channel only at a "group channel access interval (or RAW)" assigned to the group. If an STA supports an M2M application, traffic for the STA may have a property which may be generated at a long period (e.g., several tens of minutes or several hours). Since such an STA does not need to be in the awake state frequently, the STA may be in the sleep mode for g a long period of time and be occasionally switched to the awake state (that is, the awake interval of the STA may be set to be long). An STA having a long wakeup interval may be referred to as an STA which operates in a "long-sleeper" or "long-sleep" mode. The case in which the wakeup interval is set to be long is not limited to M2M communication and the wakeup interval may be set to be long according to the state of the STA or surroundings of the STA even in normal WLAN operation.

If the wakeup interval is set, the STA may determine whether a local clock thereof exceeds the wakeup interval. However, since the local clock of the STA generally uses a cheap oscillator, an error probability is high. In addition, if the STA operates in long-sleep mode, the error may be increased with time. Accordingly, time synchronization of the STA which occasionally wakes up may not match time synchronization of the AP. For example, although the STA computes when the STA may receive the beacon frame to be switched to the awake state, the STA may not actually receive the beacon frame from the AP at that timing. That is, due to clock drift, the STA may miss the beacon frame and such a problem may frequently occur if the STA operates in the long sleep mode.

Figure 14:
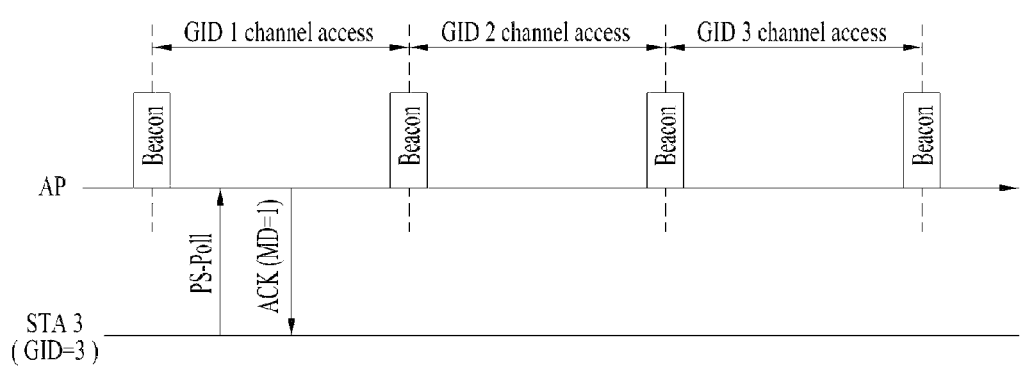
FIGS. 14 to 16 are diagrams showing examples of operation of an STA if a group channel access interval is set.
Figure 15:
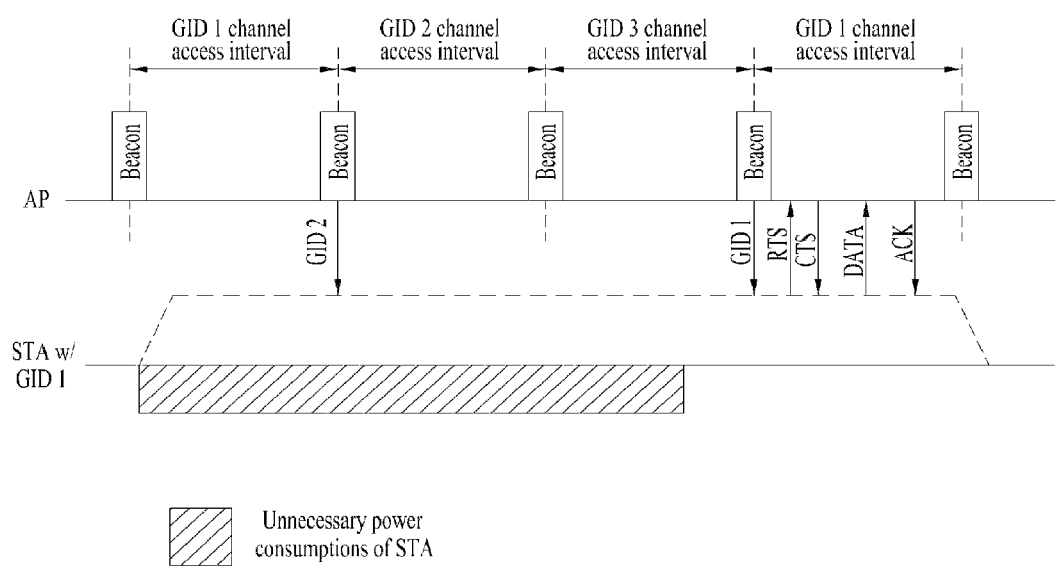
Figure 16:
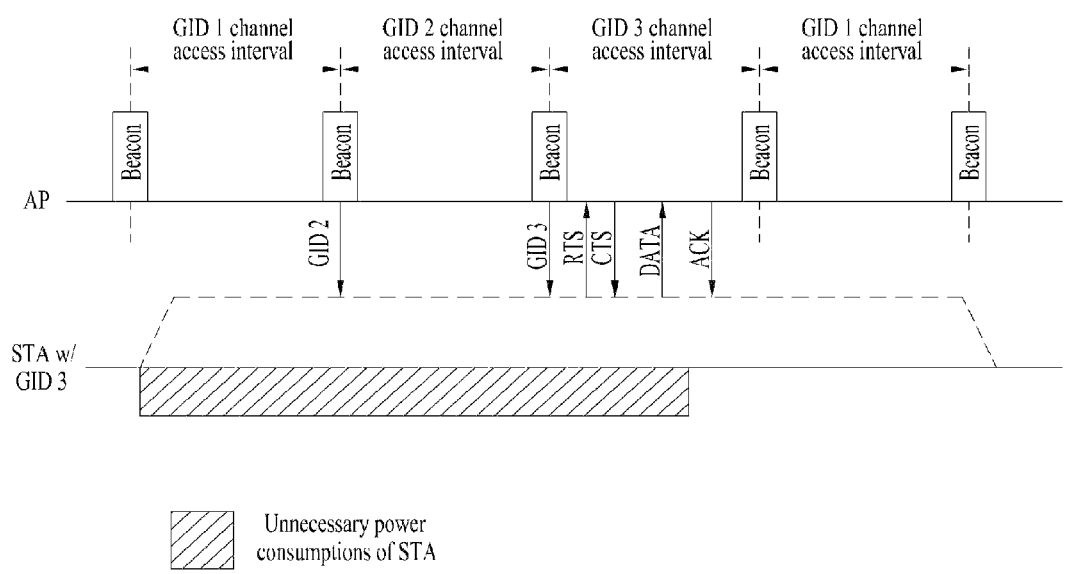

FIGS. 14 to 16 are diagrams showing examples of operation of an STA if a group channel access interval is set.

In the example of FIG. 14, STA3 may belong to group 3 (that is, GID=3), wake up at a channel access interval assigned to group 1 and perform PS-Poll for requesting frame transmission from the AP. The AP which receives PS-Poll from the STA transmits an ACK frame to STA3. If buffered data to be transmitted to STA3 is present, the AP may provide information indicating that data to be transmitted is present via the ACK frame. For example, the value of a "More Data" field (or an MD field) having a size of 1 bit included in the ACK frame may be set to 1 (that is, MD=1) to indicate the above information.

Since a time when STA3 transmits PS-Poll belongs to the channel access interval for group 1, even if data to be transmitted to STA3 is present, the AP does not immediately transmit data after transmitting the ACK frame but transmits data to STA3 at a channel access interval (GID 3 channel access of FIG. 14) assigned to group 3 to which STA3 belongs.

Since STA3 receives the ACK frame set to MD=1 from the AP, STA3 continuously waits for transmission of data from the AP. That is, in the example of FIG. 14, since STA3 cannot receive the beacon frame immediately after waking up, STA3 transmits PS-Poll to the AP on the assumption that a time when STA3 wakes up corresponds to the channel access interval assigned to the group, to which STA3 belongs, according to computation based on the local clock thereof and data to be transmitted thereto is present. Alternatively, since STA3 operates in the long-sleep mode, on the assumption that time synchronization is not performed, if the data to be transmitted thereto is present, STA3 may transmit PS-Poll to the AP in order to receive the data. Since the ACK frame received by STA3 from the AP indicates that data to be transmitted to STA3 is present, STA3 continuously waits for data reception under the assumption of the interval in which channel access thereof is granted. STA3 unnecessarily consumes power even when data reception is not allowed, until time synchronization is appropriately performed from information included in a next beacon frame.

In particular, if STA3 operates in the long-sleep mode, the beacon frame may frequently not be received, CCA may be performed even at the channel access interval, to which STA2 does not belong, thereby causing unnecessary power consumption.

Next, in the example of FIG. 15, the beacon frame is missed when the STA having GID 1 (that is, belonging to group 1) wakes up. That is, the STA which does not receive the beacon frame including the GID (or PID) assigned thereto is continuously in the awake state until the beacon frame including the GID (or PID) thereof is received. That is, although the STA wakes up at channel access interval assigned thereto, the STA cannot confirm whether the GID (or PID) thereof is included in the TIM transmitted via the beacon frame and thus cannot confirm whether the timing corresponds to the channel access interval assigned to the group thereof.

In the example of FIG. 15, the STA which is switched from the sleep state to the awake state is continuously in the awake state until the fourth beacon frame including the GID (that is, GID 1) thereof is received after the first beacon frame has been missed, thereby causing unnecessary power consumption. As a result, after unnecessary power consumption, the STA may receive the beacon frame including GID 1 and then may perform RTS transmission, CTS reception, data frame transmission and ACK reception.

FIG. 16 shows the case in which an STA wakes up at a channel access interval for another group. For example, the STA having GID 3 may wake up at the channel access interval for GID 1. That is, the STA having GID 3 unnecessarily consumes power until the beacon frame having the GID thereof is received after waking up. If a TIM indicating GID 3 is received via a third beacon frame, the STA may recognize the channel access interval for the group thereof and perform data transmission and ACK reception after CCA through RTS and CTS.

In the present invention, as described above, if group-based restricted access is granted, an improved channel access method for preventing or reducing unnecessary power consumption of the STA is proposed. In particular, the channel access method proposed by the present invention is applicable to the STA which operates in the long-sleep mode with a high probability that time synchronization with the AP is not performed.

In the present invention, if the STA switched from the sleep state to the awake state transmits a frame (a first frame) including information related to a channel access request to the AP, it is possible to prevent unnecessary power consumption of the STA using the method of, at the AP, transmitting a frame (a second frame) including information indicating whether channel access is granted. A representative example of the information indicating whether channel access is granted may be timing information. The first frame may be an existing PS-Poll frame or a new frame (e.g., a channel access request frame) proposed by the present invention. The second frame may be an existing ACK frame, an access control frame or a new frame (e.g., a channel access response frame) proposed by the present invention. Hereinafter, the detailed examples of the present invention will be described.

According to the present invention, the STA which operates in the long-sleep mode may perform access to a channel (that is, a downlink (DL) channel) from the AP to the STA and/or a channel (that is, an uplink (UL) channel) from the STA to the AP even when the beacon frame is not received (alternatively, even when the STA is not maintained in the awake state until the beacon frame including the GID (or PID) thereof is received).

In this case, the STA may transmit the first frame to the AP to request channel access. The first frame may be a PS-Poll or channel access-request (CA-REQ) frame in the present invention. The present invention is not limited thereto and predetermined frames including information described in the various examples of the present invention may be collectively referred to as the first frame.

The first frame may be transmitted at any time. That is, the first frame may be transmitted even when the STA cannot confirm whether DL data transmitted thereto is present (e.g., even when the TIM is not received).

FIG. 17 is a diagram showing examples of a channel access request (CA-REQ) frame format proposed by the present invention.

In general, the frame may include an MAC header, a payload and a frame check sequence (FCS). A certain frame may not have a payload part. The first 2 octets (that is, 16 bits) of the MAC header corresponds to a frame control field. The frame control field may include a protocol version field, a type field, a subtype field, a more data (MD) field, etc. The last 2 octet of the frame may be composed of the FCS.

As shown in FIG. 17(a), the CA-REQ frame may include an identifier (that is, AID) of an STA and an identifier (that is, a BSSID) of an AP. The AID is filled with the AID assigned to the STA and the BSSID may be filled with the identifier of the AP to which the STA transmits the CA-REQ frame. Information indicating whether the frame is a CA-REQ frame or not may be indicated using the type field and the subtype field of the frame control field. If the STA has UL data to be transmitted to the AP, the MD bit of the frame control field may be set to 1 to transmit the CA-REQ frame. In this case, since the AID field includes the GID (or PID) (that is, the AP can confirm the GDI (or PID), to which the AID belongs, through the AID of the STA), the GID (or PID) field does not need to be separately included in the CA-REQ frame.

In addition, the GID of the STA may be indicated by a hierarchical AID structure and a specific AID range within the AID range may be used to indicate the GID (see FIG. 13(a)). Accordingly, as shown in FIG. 17(b), the CA-REQ frame may be configured to separately include the AID field and the GID field.

As an additional example, as shown in FIG. 17(c), the CA-REQ frame may further include a UL/DL indicator field in addition to the exemplary frame structure of FIG. 17(a). The UL/DL indicator field may indicate whether the CA- REQ frame is an access request for a DL channel or an access request for a UL channel.

The embodiments of the present invention using various examples of the first frame will be described in detail after describing the format of the second frame.

The AP which has received the first frame (e.g., PS-Poll or CA-REQ frame) may transmit the second frame (e.g., ACK, access control or channel access-response (CA-RSP) frame to the STA in response thereto.

Figure 19:
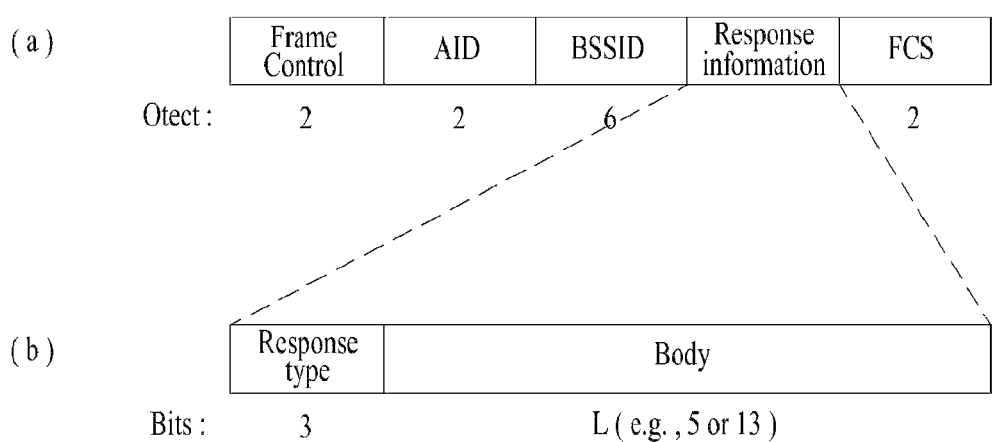

FIGS. 18 to 20 are diagrams showing examples of a channel access response (CA-RSP) frame format proposed by the present invention.

As shown in FIGS. 18 to 20, the examples of the CA-RSP frame may be defined to include a frame control field, an AID field, a BSSID field and a FCS field. Information indicating whether the frame is a CA-RSP frame may be indicated using a type field and a subtype field of the frame control field. If the AP has DL data to be transmitted to the STA, the MD bit of the frame control field may be set to 1 to transmit the CA-RSP frame.

In addition, the CA-RSP frame may include information directly/indirectly indicating whether channel access is granted to the STA which does not receive the beacon frame after waking up (or the STA which transmits the first frame). This may be referred to as response information.

In the example of FIG. 18, the response message may include timestamp information (FIG. 18(a)), ACK information (FIG. 18(b)), channel access start offset (CASO) and granted channel access duration (GCAD) information (FIG. 18(c)) or current access group number (CAGN) and next access group start offset (NAGSO) information (FIG. 18(d)). The length of each field (L, L1 or L2 in FIG. 18) may be set to a predetermined value.

Additionally, in the example of FIG. 19, an exemplary format in which the response information of the CA-RSP frame is composed of a response type field and a body part is shown. The length of the response type field may have a length of 3 bits. In this case, if the response information part has a length of 1 octet, the body part has a length of 5 bits and, if the response information part has a length of 2 octets, the body part has a length of 13 bits.

In the example of FIG. 20, the body part of the response information may be composed of channel access duration information (FIG. 20(a)), channel access duration and timestamp information (FIG. 20(b)), current channel access group ID (CCAGID) and next access group offset (NAGSO) information (FIG. 20(c)), CCAGID, NAGSO, timestamp and granted channel access duration (GCAD) information (FIG. 20(d)) or new group ID (or new AID) information (FIG. 20(e)).

The information included in the second frame (or ACK, access control or CA-RSP frame) is exemplary and may be a combination of at least one of the various examples of FIGS. 18 to 20.

Hereinafter, the embodiments of the present invention using the first frame and the second frame will be described in detail.

FIGS. 21 to 34 are diagrams showing examples of improved channel access operation using first and second frames proposed by the present invention.

Figure 21:
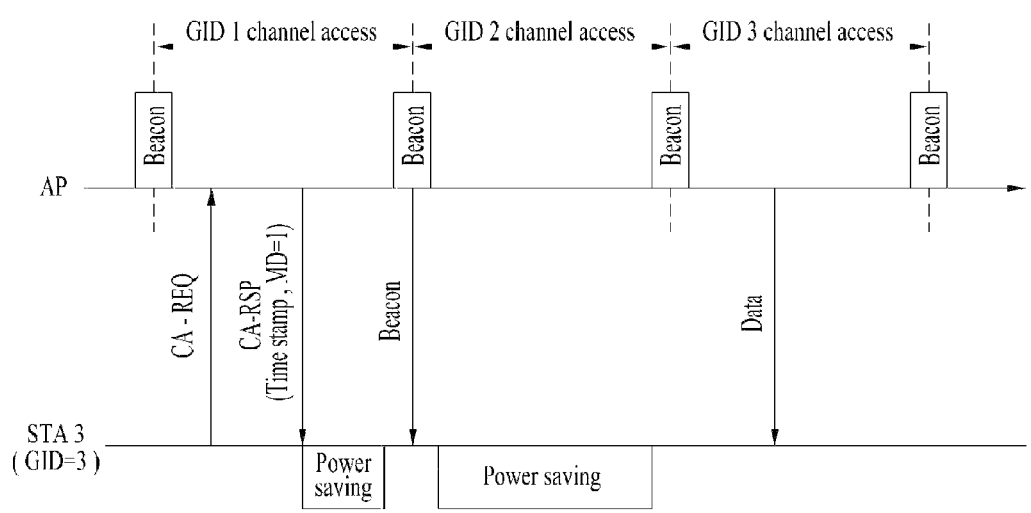
FIGS. 21 to 34 are diagrams showing examples of improved channel access operation using first and second frames proposed by the present invention.

In the example of FIG. 21, STA3 having GID 3 may transmit the first frame (e.g., the CA-REQ frame) to the AP without receiving the beacon frame after waking up. That is, STA3 may transmit the CA-REQ frame to the AP even at timing other than the channel access interval of the group thereof. In response thereto, the AP may transmit the second frame (e.g., the CA-RSP frame) to STA3. MD=1 may be set in the second frame to indicate, to STA3, that DL data to be transmitted is present.

In addition, the second frame may include timestamp information (see FIG. 18(a)). STA3 may accurately perform time synchronization with the AP via the timestamp value included in the second frame. The STA which has performed time synchronization may substantially accurately compute next beacon transmission timing and operate in the sleep mode up to that timing. STA3 which wakes up at next beacon transmission timing may successfully receive the beacon to acquire current group information (that is, information indicating a group, channel access of which is granted). Based on the acquired current group information, STA3 may compute when channel access of the group thereof is granted. For example, STA3 which has confirmed that the channel access interval of the group thereof is after a third beacon frame may be switched to the sleep mode for power saving, wake up at third beacon timing to attempt channel access, and receive DL data from the AP.

Figure 22:
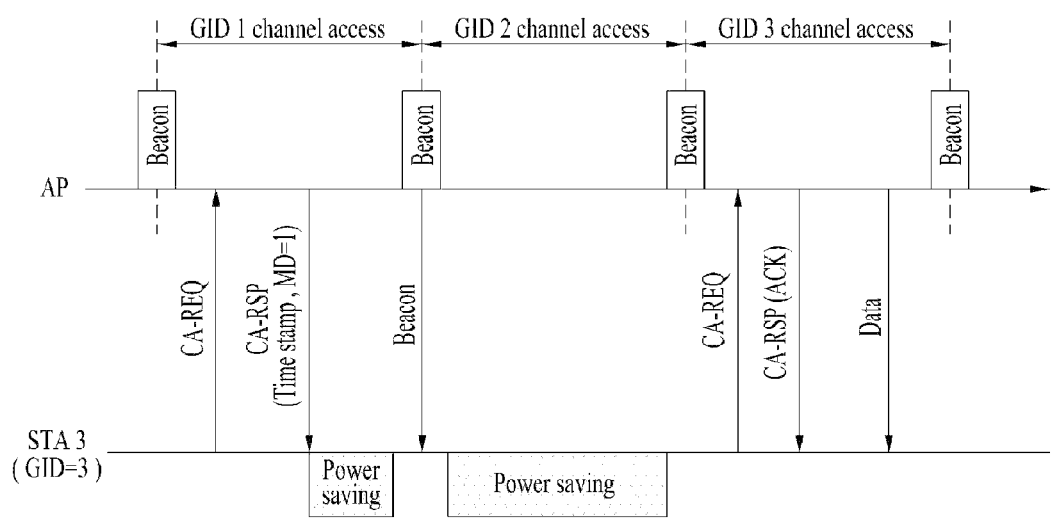

In the example of FIG. 22, as operation added to the example of FIG. 21, the STA computes the channel access interval of the group thereof from the timestamp information included in the second frame from the AP and then wake up at corresponding timing to additionally perform the channel access process (e.g., transmission and reception of the CA-REQ and CA-RSP) before receiving DL data.

In the additional channel access process, the AP may transmit the second frame (see FIG. 18(b)) including ACK information to the STA in response to the first frame and then transmit data to the STA.

The ACK information included in the second frame may be defined in the form of the ACK field as shown in FIG. 18(b) or the MD field of the frame control field may be set to 1 in the various examples (see FIGS. 18 to 20) of the second frame as in the ACK frame.

In addition, if the AP receives the first frame from the STA and channel access of the STA is possible, the AP does not transmit the CA-RSP frame as in the example of FIG. 21 but transmits the ACK frame to the STA to indicate that channel access is granted. In this case, if buffered DL data to be transmitted to the STA is present, the MD field of the ACK frame may be set to 1.

Figure 23:
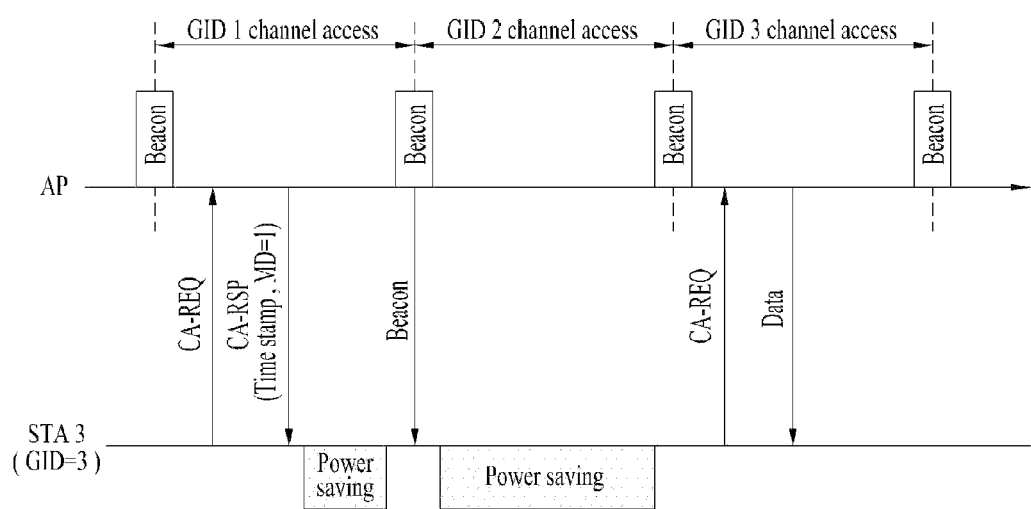

In the example of FIG. 23, the AP which has received the first frame from the STA may immediately transmit DL data to the STA without transmitting the ACK frame or the second frame including ACK. In the example of FIG. 23, operation of the STA and the AP before GID 3 channel access interval is equal to that of FIG. 22. When the STA transmits the first frame (e.g., the CA-REQ frame) to the AP at the channel access interval thereof, the AP may immediately transmit DL data.

Figure 24:
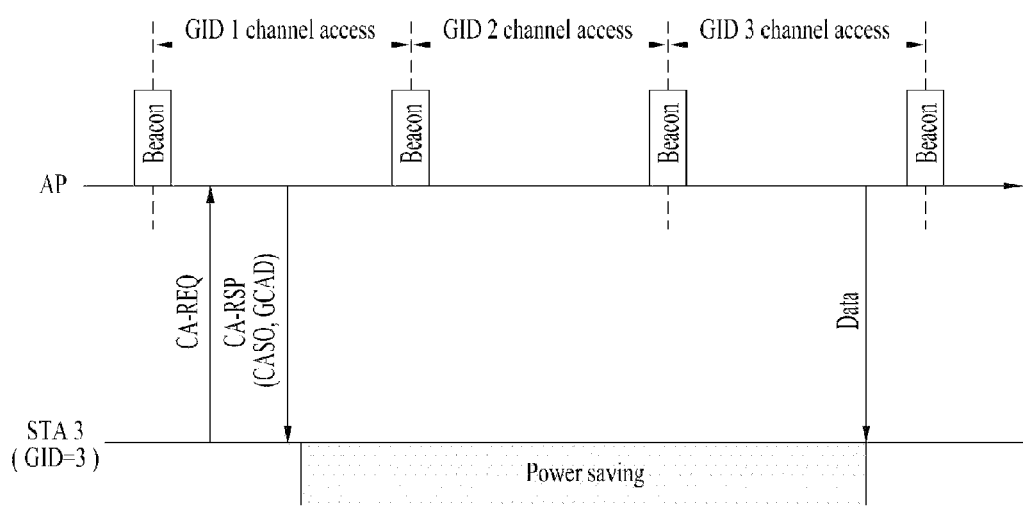

In the example of FIG. 24, the AP which has received the first frame from the STA may transmit the second frame (see FIG. 18(c)) including CASO and GCAD to the STA.

CASO indicates information regarding when channel access of the STA starts to be granted. That is, CASO indicates information indicating when an STA, the channel access of which is not currently granted, wakes up again after entering the sleep state again. In addition, CASO may be provided as predetermined timer information (that is, the STA may wake up again when a predetermined timer expires). In case of DL data transmission, CASO may be set to a time when the AP transmits DL data to the STA and, in case of UL data transmission, CASO may be set to a time when UL data transmission from the STA to the AP is granted. Alternatively, CASO may indicate a next target beacon transmission time (TBTT), a beacon transmission start time of a group, to which an STA belongs, or a start time of a group channel access interval of an STA. In case of DL data transmission, the AP may attempt DL data transmission to the STA after the time indicated by CASO. In addition, CASO may be set as a start location of a channel access interval (in the example of FIG. 24, GID 3 channel access interval) of the group, to which the STA belongs, regardless of DL/UL data transmission.

GCAD indicates a channel access duration, and a reference time (or a start time) thereof is CASO.

The STA which has acquired CASO and GCAD information from the AP via the second frame may attempt data reception at the time indicated by CASO even when the group, to which the STA belongs, is not confirmed or the location of the channel access interval of the group is not confirmed (e.g., even when a separate beacon frame is not received). Accordingly, the STA which has received CASO and GCAD via the second frame may be maintained in the sleep state up to the time indicated by CASO, thereby achieving additional power saving.

FIG. 24 shows the case in which the MD bit of the second frame is set to 1 such that the STA wakes up at the time indicated by CASO and attempts DL data reception during GCAD. Although not shown, if the MD bit of the first frame transmitted by the STA is set to 1, the STA may wake up at the time indicated by CASO and attempt UL data transmission during GCAD.

Figure 25:
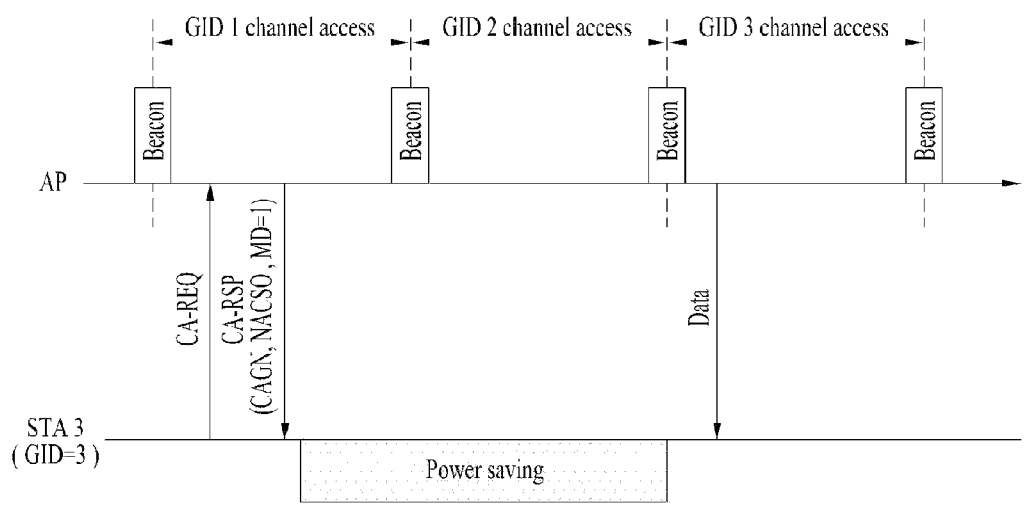

In the example of FIG. 25, the AP which has received the first frame from the STA may transmit the second frame (see FIG. 18(d) including CAGN and NAGSO information to the STA.

The STA may confirm a group, channel access of which is currently granted, from the CAGN information. In addition, the STA may confirm the start time of the next channel access interval from the NAGSO information. In the example of FIG. 25, the STA may confirm the channel access interval of the current group 1 (that is, GID 1) from the CAGN information received via the second frame and the start time of the channel access interval of group 2 (that is, GID 2), channel access of which is next granted, from the NAGSO information.

If it is assumed that the STA knows the total number of groups, the channel access intervals of all groups have the same time length and the configuration information of the groups is the same, the STA may compute the location of the channel access interval of the group thereof using CAGN and NAGSO.

$$\text{StartOffset(GID)} = \text{NAGSO} + (|\text{GID} - \text{CAGN} - 1| \bmod N)^* I \quad \text{Equation 1}$$

In Equation 1, GID denotes the group number assigned to the STA and GID may be expressed as the access group number of the STA (AGNS). CAGN denotes the number of a group, access of which is currently granted, as described above. NAGSO denotes the start time of the channel access interval of the next access group as described above and may be defined in μs. N denotes the total number of groups supported by the AP. I denotes the length of the channel access interval of one group. || denotes an absolute value and mod denotes modulo operation.

In the example of FIG. 25, since the total number of groups is 3, the GID of the STA is 3 and the current group number is 1, the start time of the channel access interval of the group (that is, group 3), to which the STA belongs, may be NAGSO+((3−1−1) mod 3)*I=NAGSO+I.

In Equation 1, it is assumed that, if the total number of groups is 4, the group numbers are 1, 2, 3 and 4. If the group numbers are 0, 1, 2 and 3, Equation 1 may be changed to Equation 2 below.

$$\text{StartOffset(GID)} = \text{NAGSO} + (|\text{GID} - \text{CAGN}| \bmod N)^* I \quad \text{Equation 2}$$

If the AP provides the CASO and NAGSO information to the STA via the second frame, the STA may wake up at the start time of the channel access interval of the group thereof and receive data, without waking up the next beacon timing to receive the beacon frame.

In addition, the STA should know the total number (N) of groups and the length (I) of the group channel access interval in advance, in order to accurately determine the start time of the channel access interval of the group thereof from the CASO and NAGSO information provided via the second frame. Information about the values N and I may be received from the AP when the STA is associated with the AP and the AID (or GID or PID) is assigned.

Figure 26:
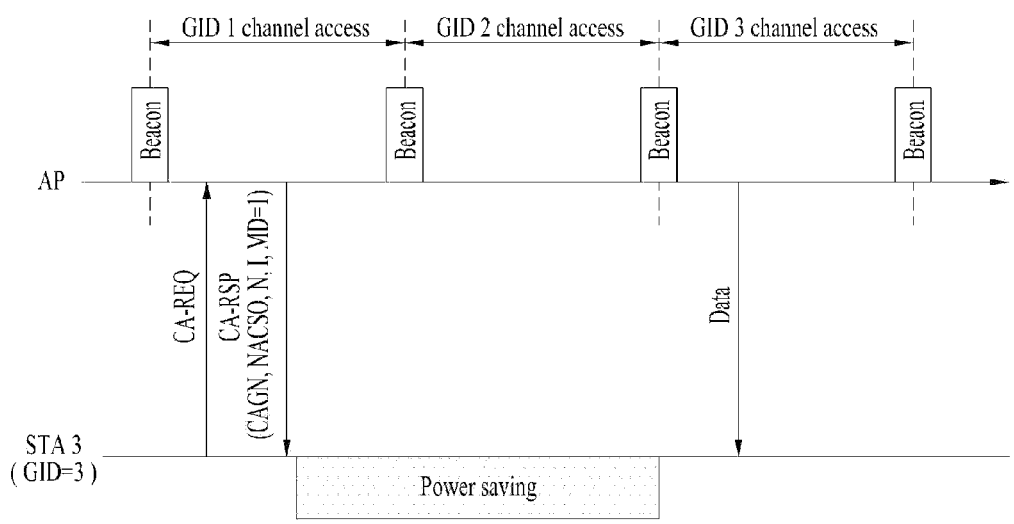

In the example of FIG. 26, if information about the total number (N) of groups managed by the AP and/or information about the length (I) of one group channel access interval is not received from the AP when the STA is assigned the AID (or GID/PID) or before the STA operates in the sleep mode, the AP may include and provide the information (e.g., the values N and I) in the second frame along with CAGN and NAGSO. The STA may determine the start time of the channel access interval corresponding to the group thereof.

In addition, in the method of including CASO and GCAD in the second frame (e.g., the CA-RSP frame) (see FIG. 18(c)) or the method of including CAGN and NAGSO (see FIG. 18(d), although the STA may perform DL data reception from the AP without the channel access operation (e.g., first frame transmission) at the channel access interval assigned to the group thereof in the examples described with reference to FIGS. 24 to 26, the present invention is not limited thereto. That is, as described with reference to FIGS. 21 to 23, even in the method using another exemplary format of the second frame, when the STA attempts channel access at the channel access interval thereof, first frame transmission, second frame reception, data reception (similar to the example of FIG. 22), first frame transmission, ACK frame reception and data reception (similar to the example of FIG. 22) or first frame transmission and data reception (similar to the example of FIG. 23) may be performed.

Figure 27:
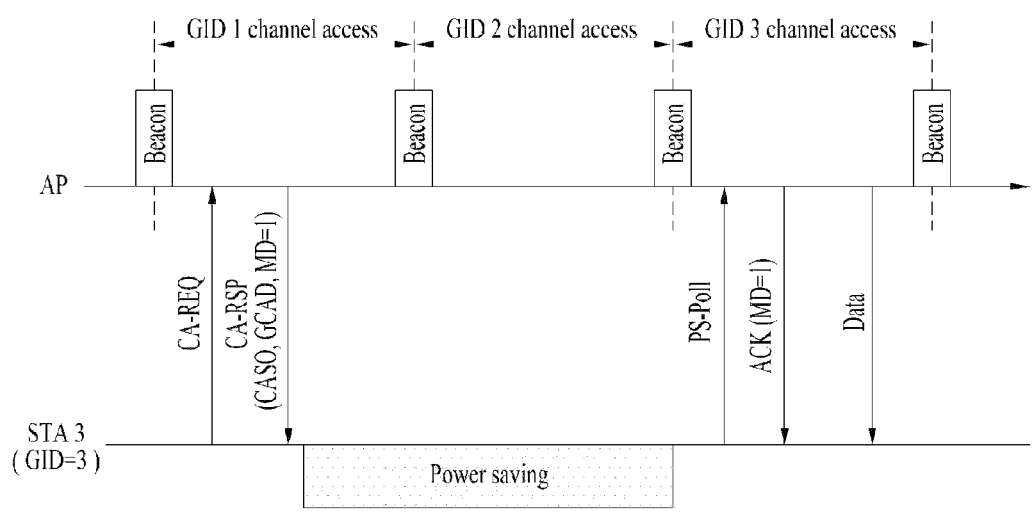

In the example of FIG. 27, when the AP transmits the second frame (e.g., the CA-RSP frame or the ACK frame) in response to the first frame (e.g., the CA-REQ or PS-Poll frame) received from the STA, if the AP has data to be transmitted to the STA, the MD bit of the second frame may be set to 1 and indicated to the STA. Alternatively, the AP may immediately transmit data to the STA without transmitting ACK after receiving the first frame (e.g., PS-Poll).

Figure 28:
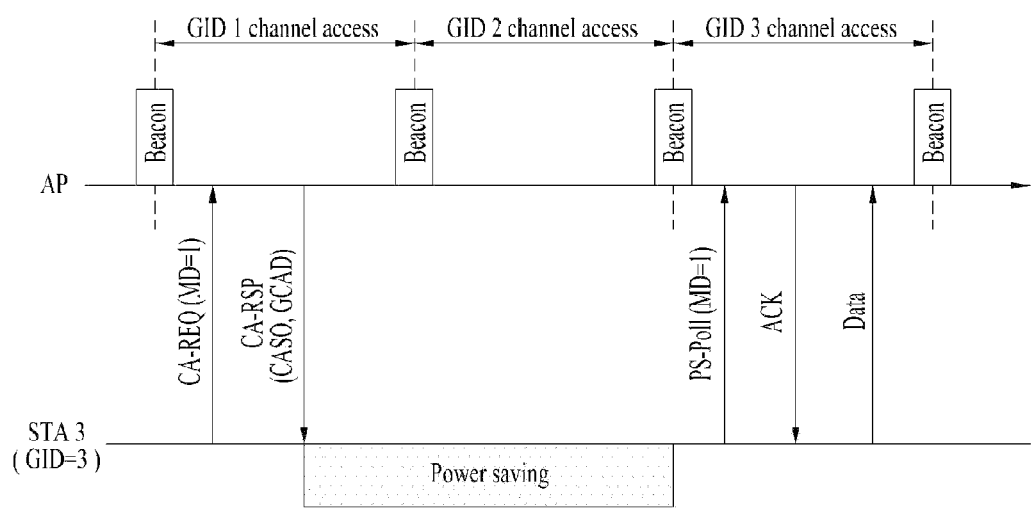

In the example of FIG. 28, when the STA transmits the first frame (e.g., the CA-REQ or PS-Poll frame) to the AP, if the STA has data to be transmitted to the AP, the MD bit of the first frame may be set to 1 and indicated to the AP. Alternatively, the STA may transmit the PS-Poll frame and then transmit data to the AP if receiving ACK or data from the AP.

FIGS. 27 and 28 show the cases in which the first frame transmitted from the STA, which does not receive the beacon frame immediately after waking up, to the AP and the second frame which is a response thereto are respectively CA-REQ and CA-RSP and the first and second frames used for A channel access at the channel access interval of the group, to which the STA belongs, are respectively PS-Poll and ACK frames. The present invention is not limited thereto and various modifications, such as the case in which the first frame used by the STA, which does not receive the beacon frame immediately after waking up, for channel access is a PS-Poll frame and the case in which the first frame transmitted to the AP at the channel access interval thereof is CA-REQ, are possible.

Although, in the examples of FIGS. 27 and 28, the STA, which does not receive the beacon frame immediately after waking up, transmits the first frame for channel access and receives the second frame in response thereto to acquire information about the channel access interval of the group, to which the STA belongs, similarly to FIG. 25, the present invention is not limited thereto. That is, examples of the first and second frames first exchanged with the AP after the STA is switched from the sleep mode to the awake mode may be configured according to any one format of FIG. 17 and FIG. 18.

Figure 29:
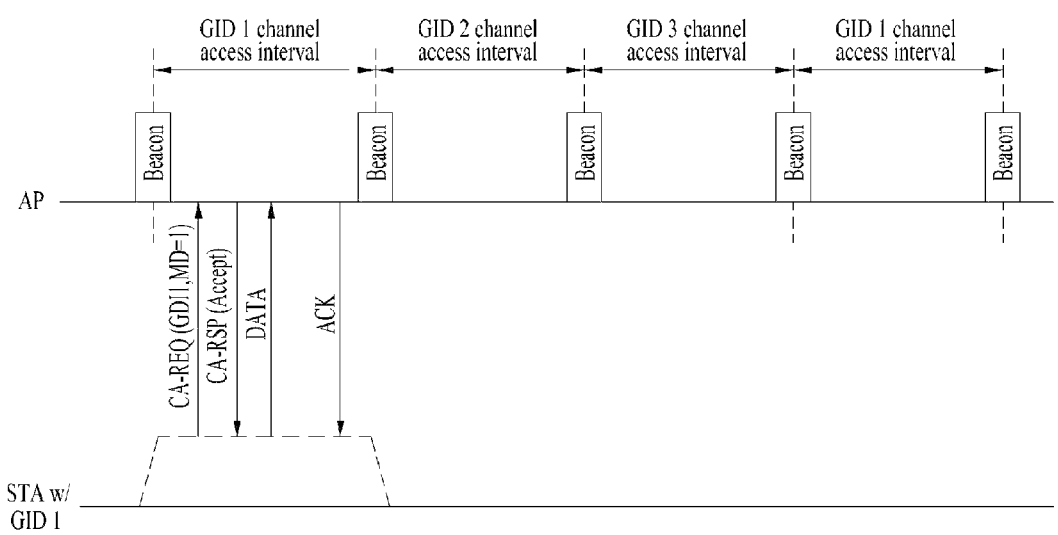

In the example of FIG. 29, if the STA is switched from the sleep mode to the awake mode in order to transmit a UL frame (e.g., a data frame, a control frame, a management frame, etc.), the STA may transmit the first frame to the AP even when the beacon frame is not received. In this case, the STA may set the MD bit of the frame control field of the first frame to 1 and transmit the first frame in order to inform the AP that data to be transmitted in UL is present. Additionally or alternatively, as in the example of FIG. 17($c$), UL/DL indicator information may be included in the first frame so as to explicitly indicate whether the first frame (e.g., the CA-REQ frame) transmitted by the STA is a channel access request for DL reception or a channel access request for UL transmission.

The AP which has received the first frame from the STA may extract GID information of the STA from the AID information included in the first frame. Based on this information, the AP may determine whether channel access of the STA is granted. For example, the AP may determine whether channel access of the STA is granted when the first frame of the STA is received. In the example of FIG. 29, since a time when the AP receives the first frame from the STA is a channel access interval for group 1 (that is, GID 1) and the GID of the STA extracted by the AP from the AID information of the first frame is 1, the AP may determine that channel access of the STA is granted. Thus, the AP may include information indicating whether channel access of the STA is granted in the second frame and transmit the second frame to the STA.

For example, the second frame may be configured in the format shown in FIG. 19. That is, the fields added to the basic fields (e.g., the frame control field, the AID field, the BSSID field and the FCS field) of the second frame may be collectively referred to as a response information field and the response information field includes a response type field and a body part. For example, the response type field may have a size of 3 bits. The value of the response type field may indicate whether channel access of the STA is granted as described above. For example, the value of the response type field in the response information field of the second frame may be defined to have the meanings shown in Table 1 below.

TABLE 1

| Value of response type field | Meanings | Description |
| --- | --- | --- |
| 000 | Accept | Channel access of STA is accepted |
| 001 | Reject | Channel access of STA is rejected |

TABLE 1-continued

| Value of response type field | Meanings | Description |
| --- | --- | --- |
| 010 | GID/AID reassignment | New GID (or AID) is assigned to STA while channel access of STA is accepted |
| 100-111 | reserved | For future use |

As described in Table 1, if the AP accepts channel access of the STA (for example, if the GID for the GID channel access interval matches the GID assigned to the STA), the response type field in the second frame may be set to 000 and the second frame may be transmitted to the STA.

In addition, the value 000 of the response type field may mean ACK for the request (channel access request using CA-REQ or PS-Poll) of the STA. Accordingly, if the STA, which has received the second frame in which the response type is set to 000, may perform UL channel access if the STA has UL data to be transmitted to the AP (for example, if the STA sets the MD bit in the first frame to 1 and transmits the first frame to the AP) and wait for and receive DL data from the AP if the STA has DL data to be received from the AP (e.g., if the AP sets the MD bit in the second frame to 1 and transmits the second frame to the STA).

The second frame transmitted by the AP may include information about current channel access duration along with the response type field (see FIG. 20($a$)). The STA may perform channel access during the current channel access duration and stop channel access if the channel access duration ends.

The second frame may include timestamp information such that the STA accurately performs time synchronization with the AP (see FIG. 20($b$)). The timestamp information may be defined to be included only if the value of the response type is 000 (that is, channel access acceptance). Alternatively, in order to provide accurate time synchronization to the STA regardless of the value of the response type, the timestamp information may be always included in the second frame.

The AP may reject the channel access request of the STA. For example, if the GID corresponding to the current channel access interval does not match the GID of the STA or if the number of STAs which attempt current channel access is too large, the channel access request of the STA may be prohibited. In this case, the AP may set the response type to 001 and transmit the second frame to the STA.

In addition, the body part of the second frame may include a current channel access group ID (CCAGID) and a next access group start offset (NAGSO) field (see FIG. 20($c$)). The CCAGID corresponds to the above-described CAGN information. This example may be more suitably used if the response type is 001 (that is, channel access rejection). For example, the STA, channel access of which has been rejected, may compute the start location (or the start offset) of the channel access interval of the group, to which the STA belongs, based on Equation 1 or 2 from the CCAGID and NAGSO information included in the second frame. Thus, the STA may attempt channel access at the start time of the channel access interval of the group, to which the STA belongs.

The body part of the second frame may include a channel access start offset (CASO) and a granted channel access duration (GCAD) field (not shown), instead of the CCAGID and the NAGSO. This may be more suitably used if the response type is 001 (that is, channel access rejection). The STA which has acquired the CASO and GCAD information from the AP via the second frame may attempt data reception during the GCAD from the time indicated by the CASO.

The body part of the second frame may include timestamp and GCAD fields in addition to the CCAGID and the NAGSO (see FIG. 20(d)). This may be more suitably used if the response type is 001 (that is, channel access rejection).

In the additional examples of the second frame format described with reference to FIGS. 19 and 20, at least one of timestamp, CCAGID, NAGSO, CASO and GCAD may be defined to be always included in the second frame regardless of the value of the response type (that is, channel access acceptance). Thus, the STA may more accurately compute the channel access interval of the group, to which the STA belongs.

In addition, the AP may change the group, to which the STA belongs, to grant data transmission to the STA. In this case, the response type of the second frame may be set to 010 and a new GID (or a new AID) may be included in the body part. For example, although GID X of the STA which requests channel access (or transmits the first frame) does not match GID Y of the current channel access interval, the AP may determine that channel access of the STA is granted in consideration of the current network situation (e.g., if the density of the access STA of the current group is low or if the STA which requests channel access is in an emergency state). In this case, the AP may reassign Y to the STA as a new GID such that the STA performs channel access at the current channel access interval. If the GID is not separately set but is estimated from information included in the AID, the AP may include a new AID in the second frame and transmit the second frame to the second frame, thereby assigning the new AID.

The STA which has received the second frame in which the response type is 001 (that is, channel access of the STA is not granted at the channel access interval corresponding to the current time) may compute the channel access grant time and duration thereof using the information included in the second frame. The STA may be in the sleep state up to that time and then switched to the awake state at that time, thereby attempting channel access.

In case of DL channel access, the STA may wait for DL data reception from the AP after the time determined by the computation result. Alternatively, for DL channel access, the STA may request channel access from the AP at the time determined by the computation result (transmission of the first frame (the CA-REQ or PS-Poll frame)). In response thereto, the AP may transmit the second frame (e.g., CA-RSP, ACK, etc.) to the STA and then transmit DL data or immediately may transmit DL data to the STA without second frame transmission.

In case of UL channel access, the STA may request UL channel access (e.g., transmission of the first frame (e.g., CA-REQ or RTS)) or may transmit UL data without first frame transmission at the time determined by the computation result. The AP may transmit the CA-RSP frame or the ACK frame if receiving the CA-REQ frame from the STA. Alternatively, the AP may transmit CTS if receiving RTS from the STA. Alternatively, the AP may transmit ACK if receiving data from the STA without the first frame or RST.

In the examples of FIGS. 30 to 34, the method using PS-Poll frame as the first frame proposed by the present invention will be described. The PS-Poll frame means a frame transmitted from the STA to the AP so as to perform the DL channel access process (that is, a process of confirming whether the AP has data to be transmitted to the STA). In response thereto, the AP may transmit data or transmit ACK in which MD=1 is set and then transmit data, if the data to be transmitted to the STA is present. If data to be transmitted to the STA is not present, the AP may transmit ACK, in which MD=0 is set, to the STA.

An existing PS-Poll frame may include a purpose for informing the AP that the STA which has received the TIM included in the beacon frame is awake and is ready for receiving DL data, as described with reference to FIG. 10 or FIG. 11. However, although the format of the PS-Poll frame used in the present invention (that is, the PS-Poll frame as the example of the first frame) may be equal to that of the existing PS-Poll frame, the PS-Poll frame may be transmitted by even the STA which does not receive the beacon frame (that is, does not receive the TIM).

Figure 30:
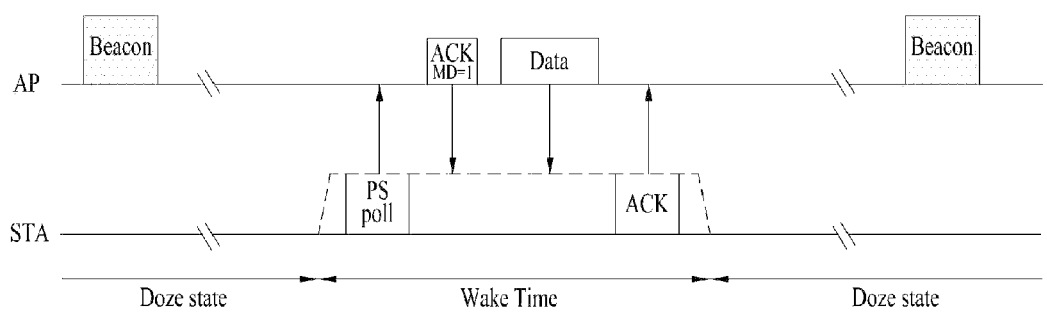

In the example of FIG. 30, the STA in the sleep state (or the doze state) may be switched to the awake state to transmit the first frame (e.g., the PS-Poll frame) to the AP in order to confirm whether DL data to be transmitted thereto is present. In response thereto, the AP may transmit, to the STA, the second frame (e.g., the ACK frame) indicating that data to be transmitted to the STA is present (that is, MD=1 is set). Thereafter, the AP may transmit DL data to the STA and the STA may transmit ACK to the AP in response thereto.

In the examples of the present invention, when the AP transmits, to the STA, the second frame (that is, the ACK frame or response frame as the response to the channel access request (or PS-Poll) of the STA), the STA may include information (e.g., time synchronization information) directly/indirectly indicating the channel access interval of the group, to which the STA belongs. For example, if the STA operates in the long-sleep mode, since a probability that time synchronization with the AP is not performed when the STA wakes up and transmits the first frame is high, the AP may include timestamp information in the second frame and transmit the second frame. That is, according to the present invention, although the STA does not solicit the timestamp from the AP, the AP may transmit the unsolicited timestamp information to the STA.

The time synchronization information (e.g., the timestamp information) of the STA may be included in the above-described second frame (e.g., the CA-RSP frame, the ACK frame, etc.) or may be transmitted in a state of being piggybacked on the data frame if data is transmitted without ACK.

Figure 31:
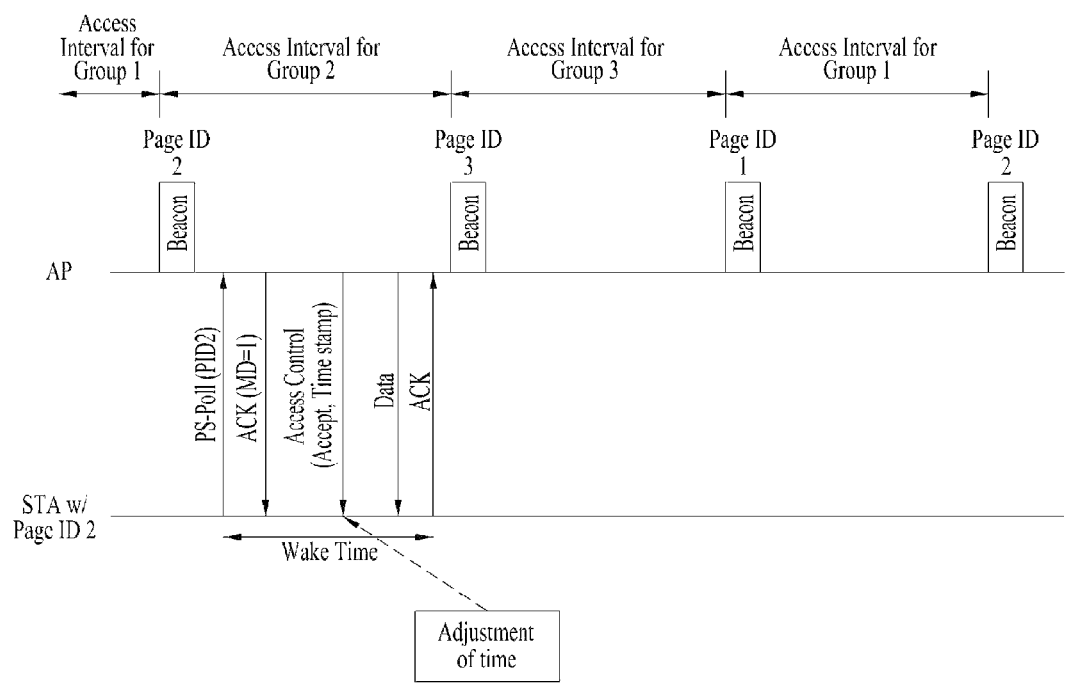

In the example of FIG. 31, the STA having PID (page ID)=2 may transmit the first frame (e.g., PS-Poll) to the AP. The AP may set MD=1 to indicate that data to be transmitted to the STA is present, while transmitting ACK in response to the PS-Poll frame. While the AP prepares data to be transmitted to the STA, the time synchronization information (e.g., the timestamp information) may be transmitted to the STA. As the frame via which the timestamp information is transmitted, the example of the second frame (e.g., the CA-RSP frame format of FIG. 18(a)) may be used. Alternatively, in the example of FIG. 31, the timestamp information may be transmitted in a standalone manner using a separate frame (e.g., an access control frame). The access control frame may include information (e.g., the response type field) indicating whether the channel access request of the STA is granted. In the example of FIG. 31, since the PID of the STA is equal to the PID of the current channel access interval, channel access is granted. Accordingly, the access control information may include information indicating channel access acceptance and timestamp information. The STA which has received the timestamp information may adjust the time thereof based on the timestamp information. Thereafter, the AP may transmit data to the STA and the STA may transmit ACK in response thereto and operate in the sleep mode again. Alternatively, the second frame may be transmitted in a state of being concatenated with the data frame.

Since the AP may implicitly confirm whether the STA operates in the long-sleep mode from the AID of the STA, it may be determined whether the time synchronization information (e.g., the timestamp information) of the STA is provided to the STA. In addition, when the STA transmits the first frame (e.g., the CA-REQ or PS-Poll frame) to the AP, the STA may include information explicitly indicating whether the STA operates in the long-sleep mode. If the AP confirms that the STA operates in the long-sleep mode from the above information, the time synchronization information (e.g., the timestamp information) may be provided to the STA.

Although the timestamp information is described as the time synchronization information of the STA in the above examples, the present invention is not limited thereto. That is, the STA may provide the STA not only with the information for directly/indirectly adjusting time synchronization but also with a variety of information shown in FIGS. 18 to 20. For example, information about a time offset (e.g., CASO) at which the STA wakes up may be provided via the second frame (e.g., the CA-RSP frame, the ACK frame, etc.).

Figure 32:
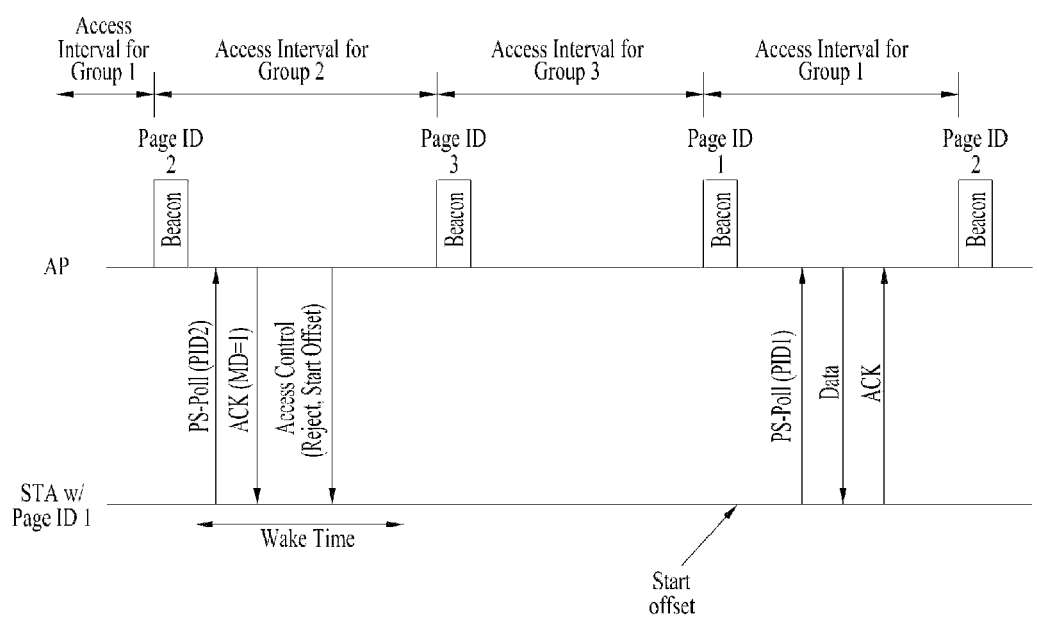

In the example of FIG. 32, if the STA having PID=1 transmits the first frame (e.g., the PS-Poll frame) and the AP has data to be transmitted to the STA, the AP may transmit the ACK frame, in which MD=1 is set, in response to the PS-Poll frame. However, since the current channel access interval is for the STA corresponding to PID=2, channel access of the STA having PID=1 is not granted. Accordingly, the AP may transmit the second frame (e.g., the access control frame) including information indicating that channel access is rejected to the STA. In addition, the AP may additionally include information about the start offset (or the start time) in the access control frame, such that the STA operates in the sleep state up to the channel access interval for the PID, to which the STA belongs. Then, the STA may wake up at the time indicated by the start offset value to perform channel access operation (e.g., transmission of the first frame (e.g., the PS-Poll frame) and properly receive DL data thereof.

Figure 33:
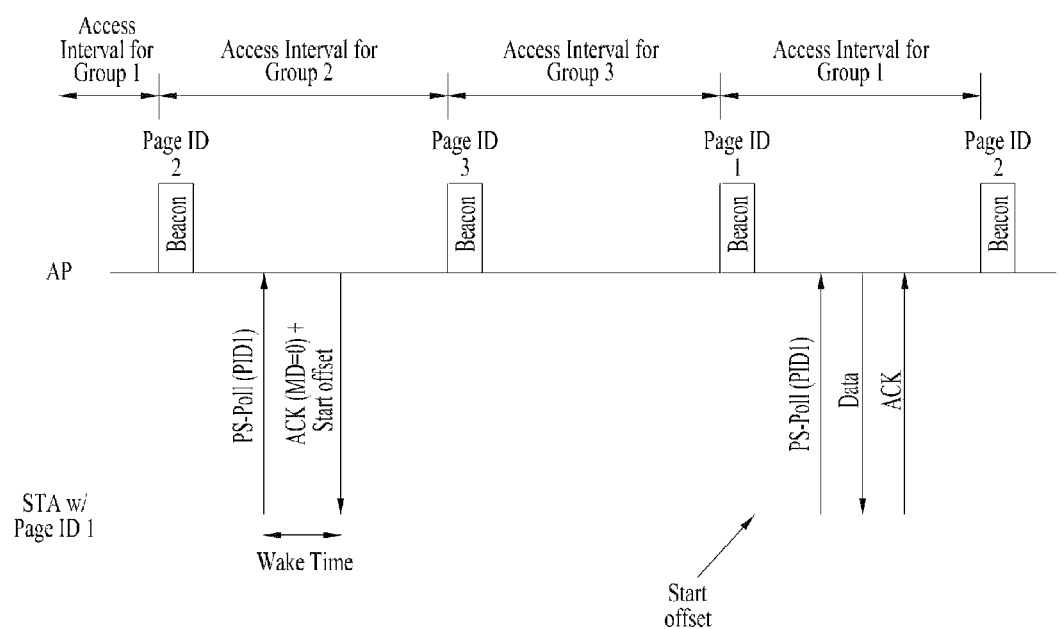

In the example of FIG. 33, if the STA having PID=1 transmits the first frame (e.g., the PS-Poll frame) and the AP has data to be transmitted to the STA, the same operation as FIG. 32 is performed. However, in order to simplify the channel access request/response procedure, although data for STA is present, if the PID of the STA does not match the PID of the current channel access interval, the AP may set the MD bit of the second frame (e.g., the ACK frame) to 0. In addition, information about when the channel access interval for the PID, to which the STA belongs, starts (that is, the start offset) may be provided to the STA along with the ACK. Various formats of the second frame (for example, the CA-RSP frame, the ACK frame, the access control frame, etc.) may be used.

In the above examples, the STAs, which have received information about the channel accessible time from the AP, may operate in the sleep mode and then wake up at that time to attempt channel access. In this case, the woken-up STA may transmit the first frame (e.g., the CA-REQ or PS-Poll frame) or wait for DL data without transmitting the first frame.

Figure 34:
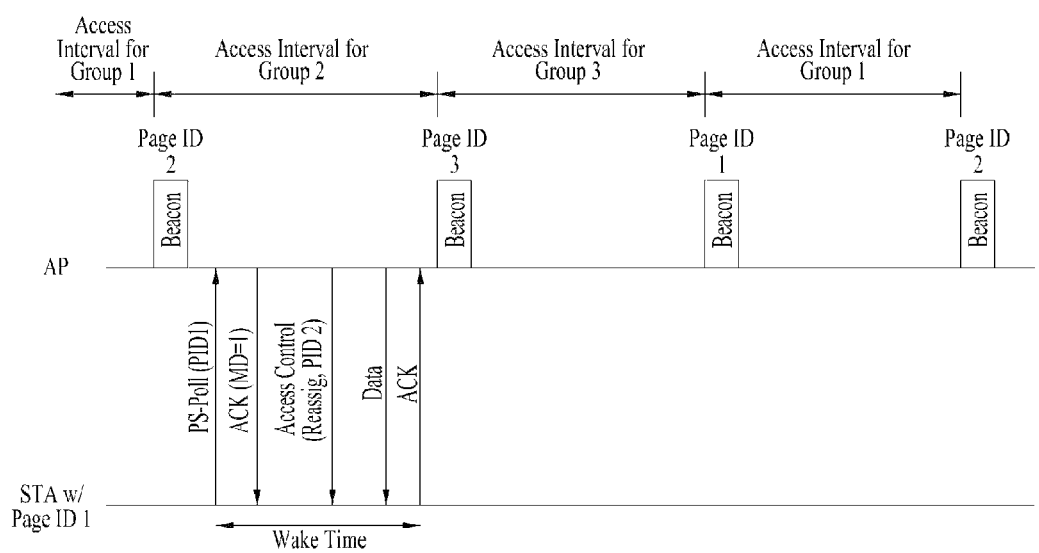

In the example of FIG. 34, if the STA having PID=1 transmits the first frame (e.g., the PS-Poll frame) and the AP has data to be transmitted to the STA, the same operation as FIG. 33 is performed. However, in the present example, the AID (or PID/GID) may be reassigned to the STA which does not belong to the PID of the current channel access interval to grant channel access at the current channel access interval, thereby simplifying the operations of the STA and the AP. In the example of FIG. 34, the AP which has received the first frame of the STA having PID=1 may transmit information for reassigning 2 which is the PID of the current channel access interval as a new PID of the STA having PID=1. The above information may be used using the exemplary format (e.g., FIG. 20(e)) of the second frame or a new independent frame (e.g., the access control frame). In this case, the response type field of the second frame may be set to a value indicating AID (or PID/GID) reassignment, instead of a value indicating channel access acceptance or rejection. Thus, the STA may re-set the AID (or PID/GID) to a new value, perform channel access to the AP at the current channel access interval, and properly receive DL data.

In addition, even if the AP reassigns the AID (or PID/GI) of the STA, the time synchronization information (e.g., the timestamp information, information about the time offset at which the STA wakes up (e.g., CASO), channel access duration information, etc.) of the STA may be additionally provided to the STA. That is, as described above, the AP may include the time synchronization information of the STA in the second frame regardless of channel access acceptance/rejection/ID reassignment of the STA for requesting channel access (that is, transmitting the first frame) at the current channel access interval (at any time). In addition, the time synchronization information may include the timestamp information, next beacon transmission time information, information about the time offset at which the STA wakes up (e.g., CASO), information about duration when the STA may use the channel (e.g., GCAD), etc.

Figure 35:
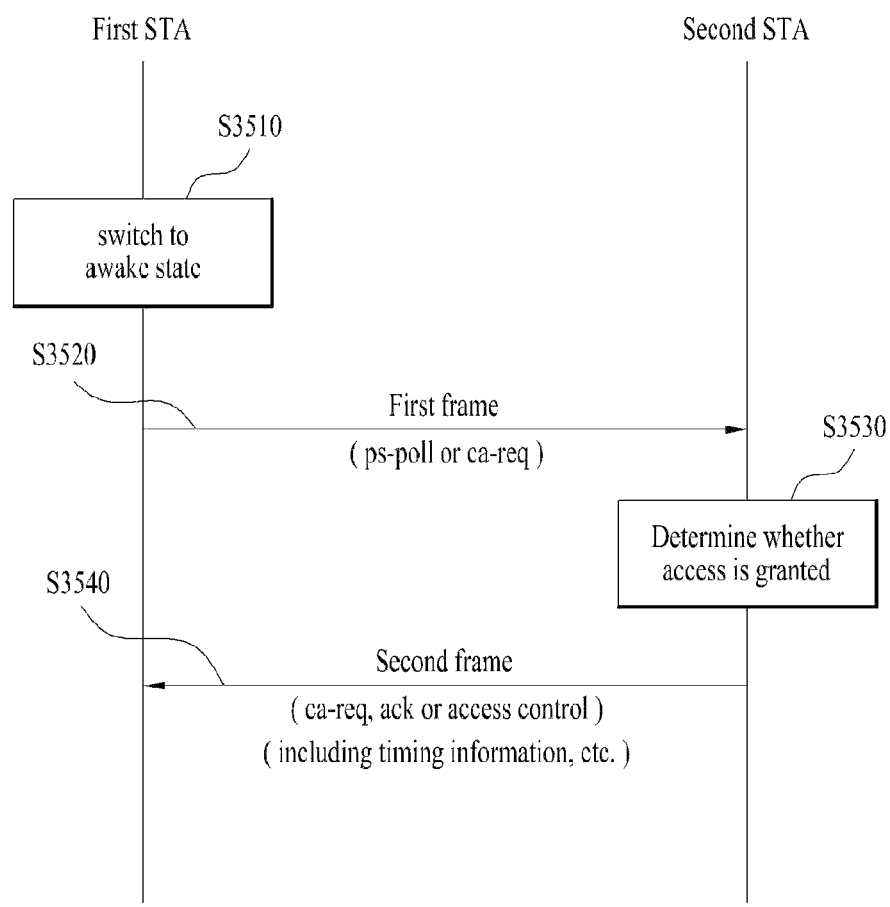
FIG. 35 is a flowchart illustrating a channel access method according to an example of the present invention.

FIG. 35 is a flowchart illustrating a channel access method according to an example of the present invention.

In step S3510, a first STA (e.g., a non-AP STA) may be switched from the sleep state to the awake state.

In step S3520, the first STA may transmit the first frame (e.g., the PS-Poll or CA-REQ frame) proposed by the present invention to a second STA (e.g., an AP). For example, if the first STA wakes up, the first STA may transmit the first frame at any time (e.g., even when a TIM is not acquired via a beacon frame).

In step S3530, the second STA may determine whether channel access of the first STA is granted in consideration of the information included in the first frame transmitted by the first STA, a group number corresponding to a current channel access interval, and a network state.

In step S3540, the second STA may transmit the second frame (e.g., ACK, CA-RSP or access control frame) proposed by the present invention to the first STA in response to the first frame received from the first STA. The second frame may include timing information such as time synchronization information of the first STA or information about when the STA wakes up after entering the sleep mode. The information described in the above-described examples of the present invention may be included in the second frame.

Therefore, the first STA may perform channel access while minimizing power consumption, although time synchronization with the second STA is not performed.

Details described in the above embodiments of the present invention may be independently applied or two or more embodiments may be simultaneously applied.

Figure 36:
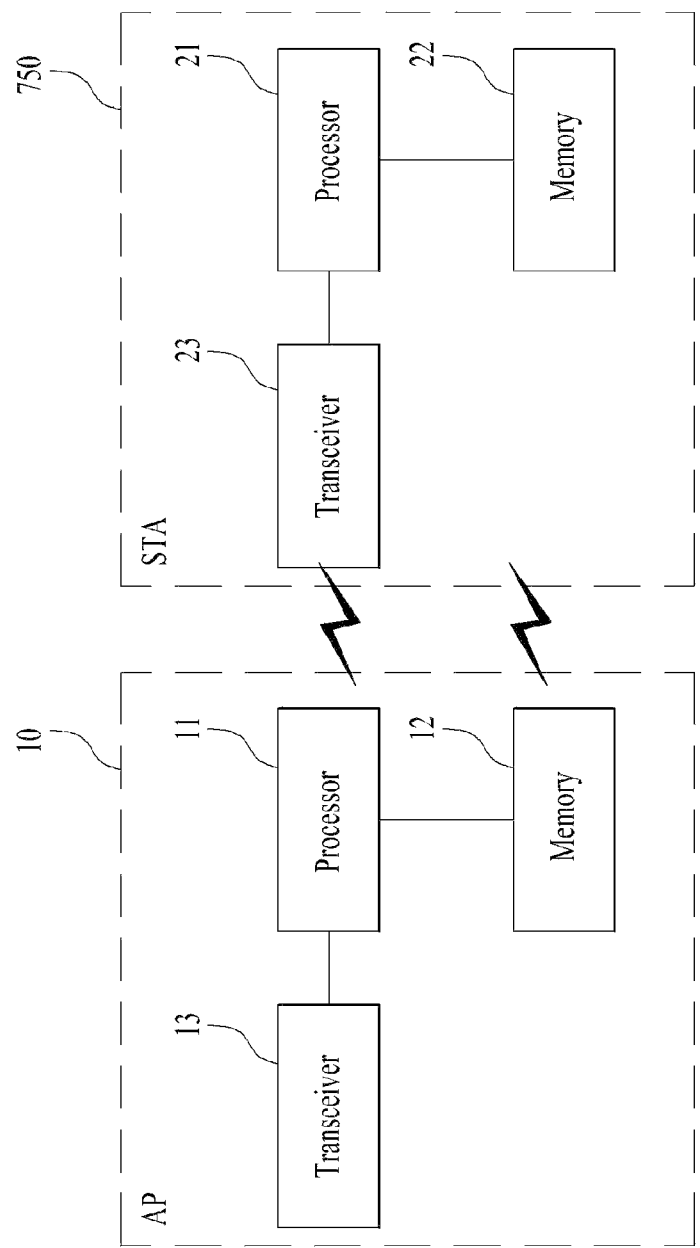
FIG. 36 is a block diagram showing the configuration of a wireless apparatus according to one embodiment of the present invention.

FIG. 36 is a block diagram showing the configuration of a wireless apparatus according to one embodiment of the present invention.

The AP 10 may include a processor 11, a memory 12 and a transceiver 13. The STA 20 may include a processor 21, a memory 22 and a transceiver 23. The transceivers 13 and 23 may transmit/receive a radio frequency (RF) signal and implement a physical layer according to an IEEE 802 system, for example. The processors 11 and 21 may be respectively connected to the transceivers 13 and to implement a physical layer and/or an MAC layer according to the IEEE 802 system. The processors 11 and 21 may be configured to perform operation according to the above-described various embodiments of the present invention. In addition, modules implementing operations of the AP and the STA according to the above-described embodiments of the present invention may be stored in the memories 12 and 22 and may be executed by the processors 11 and 21, respectively. The memories 12 and 22 may be mounted inside or outside the processors 11 and 21 to be connected to the processors 11 and 21 by known means, respectively.

The detailed configuration of the AP and the STA apparatus may be implemented such that details described in the above embodiments of the present invention is independently applied or two or more embodiments are simultaneously applied. In this case, overlapping details will be omitted from the description for clarity.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs) programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

Although the above-described various embodiments of the present invention are applied to the IEEE 802.11 system, the embodiments of the present invention are applicable to various mobile communication systems.

The invention claimed is:

1. A method of performing channel access by a specific mode station (STA) which is allowed not to check a beacon frame from an access point (AP) in a wireless communication system, the method comprising:
    transmitting, by the specific mode STA, a first frame for initiating channel access to the AP during a specific period of time allocated to a group of STAs not including the specific mode STA, wherein the specific period of time is prohibited for channel access other than the group of STAs except the specific mode STA which is allowed not to check the beacon frame;
    receiving, by the specific mode STA, a second frame including a channel access start offset value for the specific mode STA from the AP;
    entering into a doze state, at the specific mode STA, up to a timing indicated by the channel access start offset value of the second frame; and
    changing to a awake state, at the specific mode STA, from the timing indicated by the channel access start offset value of the second frame for channel access.

2. The method of claim 1, wherein the specific mode STA is a STA having M2M (Machine-to-Machine) communication application.

3. The method of claim 1, wherein a beacon frame transmitted by the AP informs STAs, other than the specific mode STA, information on channel access interval assigned to each group of STAs.

4. A specific mode station (STA) apparatus which is allowed not to check a beacon frame from an access point (AP) in a wireless communication system, the STA apparatus comprising:
    a transceiver configured to transmit a first frame for initiating channel access to the AP, and to receive a second frame including a channel access start offset value for a specific mode STA, wherein the transceiver transmits the first frame during a specific period of time allocated to a group of STAs not including the specific mode STA, wherein the specific period of time is prohibited for channel access other than the group of STAs except the specific mode STA which is allowed not to check the beacon frame; and
    a processor connected to the transceiver and configured to enter into a doze state up to a timing indicated by the channel access start offset value of the second frame; and to change to a awake state from the timing indicated by the channel access start offset value of the second frame for channel access.

5. The STA apparatus of claim 4, wherein the processor comprises a M2M (Machine-to-Machine) communication application.

6. The STA apparatus of claim 4, wherein a beacon frame transmitted by the AP informs STAs, other than the specific mode STA, information on channel access interval assigned to each group of STAs.

* * * * *